(12) United States Patent
Akabori

(10) Patent No.: US 11,356,627 B2
(45) Date of Patent: Jun. 7, 2022

(54) IMAGING APPARATUS AND EQUIPMENT

(71) Applicant: CANON KABUSHIKI KAISHA, Tokyo (JP)

(72) Inventor: Hiroo Akabori, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 16/907,471

(22) Filed: Jun. 22, 2020

(65) Prior Publication Data

US 2020/0412990 A1 Dec. 31, 2020

(30) Foreign Application Priority Data

Jun. 28, 2019 (JP) .............................. JP2019-122101

(51) Int. Cl.
  *H04N 5/374* (2011.01)
  *H04N 5/361* (2011.01)

(52) U.S. Cl.
  CPC ............ *H04N 5/374* (2013.01); *H04N 5/361* (2013.01)

(58) Field of Classification Search
  CPC .. H04N 5/374; H04N 5/361; H04L 27/14603; H04L 27/14623; H04L 27/1463
  See application file for complete search history.

(56) References Cited

U.S. PATENT DOCUMENTS

| 7,679,658 B2 | 3/2010 | Sakurai et al. |
| 9,831,278 B2 | 11/2017 | Kato et al. |
| 2006/0237629 A1 | 10/2006 | Oda |
| 2015/0097219 A1 | 4/2015 | Kato et al. |
| 2020/0357754 A1* | 11/2020 | Toyoshima ............ H04N 5/372 |
| 2021/0288093 A1* | 9/2021 | Suzuki .............. H01L 27/14623 |

FOREIGN PATENT DOCUMENTS

| JP | 2005-223133 A | 8/2005 |
| JP | 2007-027845 A | 2/2007 |
| JP | 2007-158626 A | 6/2007 |
| JP | 2009-016432 A | 1/2009 |
| JP | 2012-124213 A | 6/2012 |

* cited by examiner

*Primary Examiner* — Kevin K Pyo
(74) *Attorney, Agent, or Firm* — Venable LLP

(57) ABSTRACT

An imaging apparatus includes a light receiving pixel, a first light shielded pixel, and a second light shielded pixel. The first light shielded pixel includes a first transfer transistor and the second light shielded pixel includes a second transfer transistor. Impurity concentration of a source of the first transfer transistor is lower than impurity concentration of a source of the second transfer transistor. The first light shielded pixel includes a first element isolation structure and the second light shielded pixel includes a second element isolation structure different from the first element isolation structure. An area of an interface between a semiconductor region and an insulator in the first light shielded pixel is different from an area of an interface between a semiconductor region and an interface in the second light shielded pixel.

20 Claims, 38 Drawing Sheets

IMAGING APPARATUS AND EQUIPMENT

BACKGROUND OF THE INVENTION

Field of the Invention

The present invention relates to an imaging apparatus and an equipment.

Description of the Related Art

Japanese Patent Laid-Open No. 2007-158626 discloses a solid-state imaging apparatus that includes an aperture pixel region, an optical black region, and a black reference pixel region. Pixels of the aperture pixel region accumulate and output charges generated in accordance with incident light. Pixels (to be referred to as OB pixels hereinafter) of the optical black region have a structure similar to the pixels of the aperture pixel region, but are shielded from the light. Pixels (to be referred to as NULL pixels hereinafter) of the black reference pixel region are pixels that do not include an impurity region for accumulating charges, but otherwise have an arrangement similar to the pixels of the aperture pixel region.

The signal of the OB pixel and the signal of the NULL pixel can be used to correct the signal of the pixel of the aperture pixel region. However, depending on the design of the OB pixel and the NULL pixel, an effective difference between the signal of the OB pixel and the signal of the NULL pixel cannot be obtained, and the signals of the OB pixel and the NULL pixel cannot be used to correct the signal of the pixel of the aperture pixel region. For example, if the signal of the NULL pixel has a large dark current component, the signal of the OB pixel and the signal of the NULL pixel will be at the same level. In such a case, the signals of the OB pixel and the NULL pixel cannot be used to obtain the information for correcting the signal of the pixel of the aperture pixel region. Hence, the image quality cannot be improved sufficiently.

SUMMARY OF THE INVENTION

The present invention provides a technique advantageous in improving the image quality of an image obtained by an imaging apparatus.

One of aspects of the present invention provides an imaging apparatus that includes a light receiving pixel, a first light shielded pixel, and a second light shielded pixel, wherein the first light shielded pixel includes a first transfer transistor, the second light shielded pixel includes a second transfer transistor, an impurity concentration of a source of the first transfer transistor is lower than an impurity concentration of a source of the second transfer transistor, the first light shielded pixel includes a first element isolation structure, and the second light shielded pixel includes a second element isolation structure different from the first element isolation structure, and an area of an interface between a semiconductor region and an insulator in the first light shielded pixel is different from an area of an interface between a semiconductor region and an interface in the second light shielded pixel.

Further features of the present invention will become apparent from the following description of exemplary embodiments with reference to the attached drawings.

DESCRIPTION OF THE EMBODIMENTS

Figure 1:
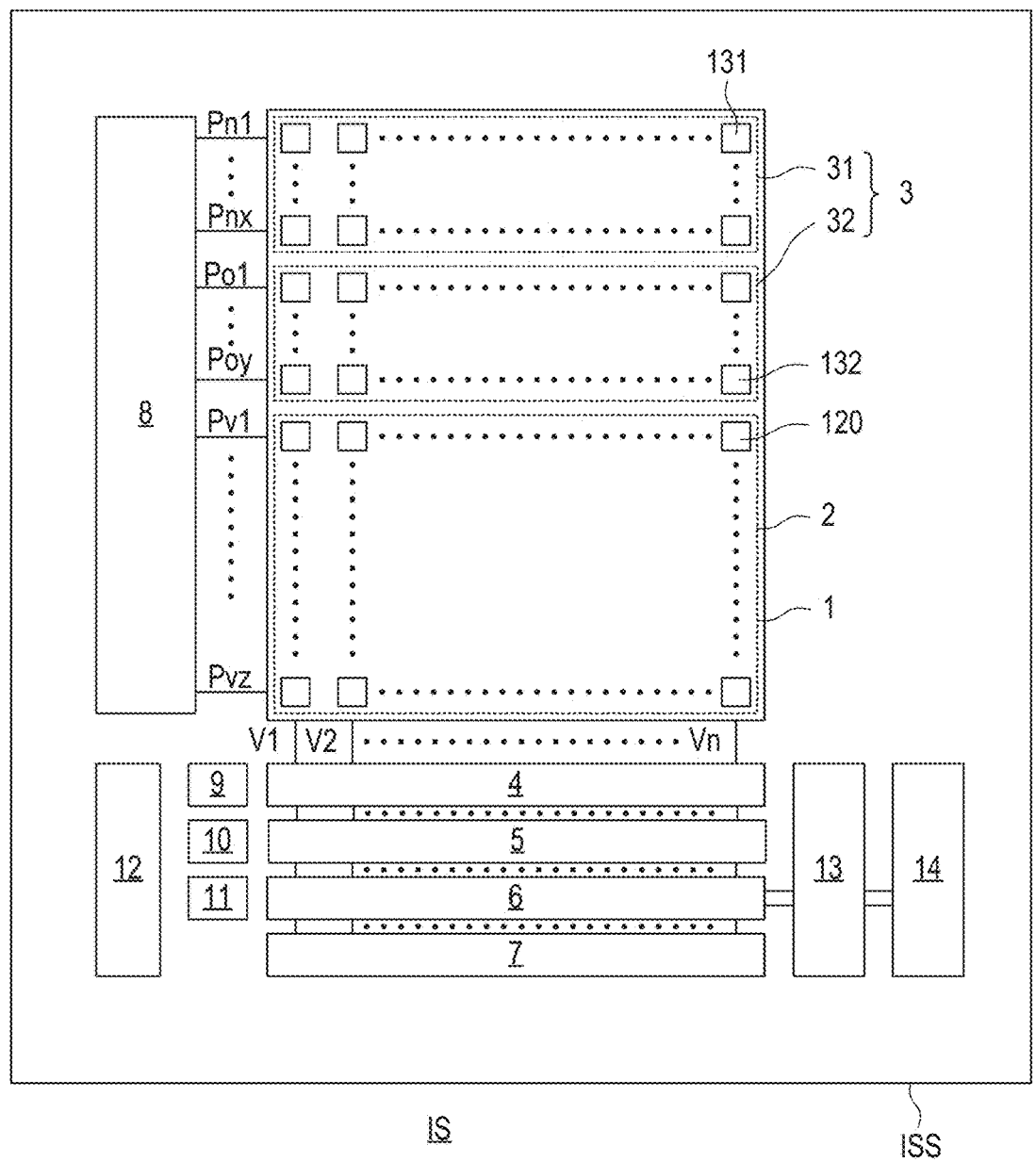
FIG. 1 is a schematic plan view showing the arrangement of an imaging apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a schematic plan view showing the arrangement of an imaging apparatus (image sensor) IS according to the first embodiment. The plan view is an orthogonal projection of the imaging apparatus IS with respect to a plane perpendicular to the normal of an imaging plane of the imaging apparatus IS, and is also referred to as a planar view. The imaging apparatus IS includes a first semiconductor chip ISS, and the first semiconductor chip ISS includes a pixel region 1. The pixel region 1 can include a light receiving pixel region 2 and a light shielded pixel region 3. The light receiving pixel region 2 includes a plurality of light receiving pixels 120, and each light receiving pixel 120 converts incident light into an electrical signal corresponding to the incident light amount.

The light shielded pixel region 3 can include a first light shielded pixel region 31 and a second light shielded pixel region 32. The first light shielded pixel region 31 includes one or a plurality of first light shielded pixels 131. Each first light shielded pixel 131 can be defined as a pixel that is a light shielded pixel and a pixel which does not include a charge accumulation region. Alternatively, each first light shielded pixel 131 can be defined as a pixel that is a light shielded pixel and a pixel which does not include a photo-electric conversion element. The second light shielded pixel region 32 includes one or a plurality of second light shielded pixels 132. Each second light shielded pixel 132 can be defined as a pixel that is a light shielded pixel and a pixel which includes a photoelectric conversion element including a charge accumulation region. In one example, the first light shielded pixel 131 can be called a NULL pixel, and the second light shielded pixel 132 can be called an OB pixel. In another example, the first light shielded pixel 131 can be called a first OB pixel, and the second light shielded pixel 132 can be called a second OB pixel.

The first light shielded pixel 131 and the second light shielded pixel 132 can be relatively defined based on the differences between their respective characteristics. For example, the first light shielded pixel 131 can include a first transfer transistor, a second light shielded pixel 132 can include a second transfer transistor, and a relationship in which the impurity concentration of the source of the first transfer transistor is lower than the impurity concentration of the source of the second transfer transistor can be defined.

The light receiving pixel 120 includes a third transfer transistor. In one example, the difference between the impurity concentration of the source of the first transfer transistor and the impurity concentration of the source of the second transfer transistor is larger than the difference between the impurity concentration of the source of the third transfer transistor and the impurity concentration of the source of the second transfer transistor. Alternatively, the impurity concentration of the third transfer transistor can be equal to the impurity concentration of the source of the second transfer transistor. The impurity concentration of the source of the first transfer transistor of the first light shielded pixel 131 can be lower than the impurity concentration of the drain of the first transfer transistor of the first light shielded pixel 131. The impurity concentration of the source of the second transfer transistor of the second light shielded pixel 132 can be higher than the impurity concentration of the drain of the second transfer transistor of the first light shielded pixel 132. The impurity concentration of the source of the third transfer transistor of the light receiving pixel 120 can be higher than the impurity concentration of the drain of the third transfer transistor of the light receiving pixel 120. In one example, the difference between the impurity concentration of the source of the first transfer transistor and the impurity concentration of the source of the second transfer transistor is larger than the difference between the impurity concentration of the drain of the first transfer transistor and the impurity concentration of the drain of the second transfer transistor. Alternatively, the impurity concentration of the drain of the first transfer transistor can be equal to the impurity concentration of the drain of the second transfer transistor. In this manner, in the first light shielded pixel 131, by relatively decreasing the impurity concentration of the source of the first transfer transistor, a noise component (a noise charge or a dark current) that can be included in the source of the first transfer transistor can be decreased to decrease the noise component (the noise charge) to be transferred to the drain of the first transfer transistor. Hence, the noise component of a signal corresponding to the output of the first light shielded pixel 131 can be decreased. As a result, the second light shielded pixel 132, whose correction accuracy can be improved based on the signal corresponding to the output of the first light shielded pixel 131, can be a pixel which differs from the light receiving pixel 120 in only the point that it is a light shielded pixel. More specifically, the first light shielded pixel 131 includes a first element isolation structure, and the second light shielded pixel 132 includes a second element isolation structure that has a different structure from the first element isolation structure (to be described later).

In the first light shielded pixel region 31, the plurality of first light shielded pixels 131 can be arranged so as to form a plurality of rows (x rows (x is a natural number equal to or more than 2) in FIG. 1) and a plurality of columns (n columns (n is a natural number equal to or more than 2) in FIG. 1). In the second light shielded pixel region 32, the plurality of second light shielded pixels 132 can be arranged so as to form a plurality of rows (y rows (y is a natural number equal to or more than 2) in FIG. 1) and a plurality of columns (n columns (n is a natural number equal to or more than 2) in FIG. 1). In the light receiving pixel region 2, the plurality of light receiving pixels 120 can be arranged so as to form a plurality of rows (z rows (z is a natural number equal to or more than 2) in FIG. 1) and a plurality of columns (n columns (n is a natural number equal to or more than 2) in FIG. 1). The first light shielded pixel region 31 may include the first light shielded pixel 131 that is arranged in a column in which the light receiving pixel 120 is not arranged. The second light shielded pixel region 32 may include the second light shielded pixel 132 that is arranged in a column in which the light receiving pixel 120 is not arranged. The first light shielded pixel region 31 and/or the second light shielded pixel region 32 may be arranged so as to surround the light receiving pixel region 2.

The first semiconductor chip ISS of the imaging apparatus IS can include a vertical driving unit 8 as a component of a readout circuit for reading out signals from the light receiving pixels 120, the first light shielded pixels 131, and the second light shielded pixels 132 in the pixel region 1. The vertical driving unit 8 can control (drive) row control lines Pn1 to Pnx for controlling the first light shielded pixels 131 which are arranged so as to form x rows, and row control lines Po1 to Pox for controlling the second light shielded pixels 132, which are arranged so as to form y rows. The vertical driving unit 8 can also control (drive) row control lines Pv1 to Pvz for controlling the light receiving pixels 120 which are arranged so as to form z rows.

The plurality of first light shielded pixels 131, the plurality of second light shielded pixels 132, and the plurality of light receiving pixels 120 can be arranged so as to form n columns. A plurality of column signal lines V1 to Vn can be arranged so as to cut across the first light shielded pixel region 31, the second light shielded pixel region 32, and the light receiving pixel region 2. Each column signal line is connected to the corresponding first light shielded pixels 131 of the plurality of first light shielded pixels 131, the corresponding second light shielded pixels 132 of the plurality of second light shielded pixels 132, and the corresponding light receiving pixels 120 of the plurality of light receiving pixels 120.

Each of the light receiving pixel 120, the first light shielded pixel 131, and the second light shielded pixel 132 can include at least a charge-voltage converter (floating diffusion), a transfer transistor, an amplification transistor, and a reset transistor. Each light receiving pixel 120 and each second light shielded pixel 132 can include a photoelectric conversion element including a charge accumulation region, and the charge accumulation region can form the source of the transfer transistor. The drain of the transfer transistor can form the charge-voltage converter, and be electrically connected to the gate of the amplification transistor. Alternatively, the drain of the transfer transistor can form a charge holding unit, and the charges of the charge holding unit can be transferred to the charge-voltage converter by the second transfer transistor. The charge-voltage converter can be electrically connected to the gate of the amplification transistor. The reset transistor can be formed to reset the voltage (potential) of the charge-voltage converter. A signal that is output to a column signal line from each of the light receiving pixel 120, the first light shielded pixel 131, and the second light shielded pixel 132 in a state in which the voltage of the charge-voltage converter has been reset can be referred to as a noise signal (N signal). A signal that is output to a column signal line from each of the light receiving pixel 120, the first light shielded pixel 131, and the second light shielded pixel 132 in a state in which charges have been transferred to the charge-voltage converter can be referred to as an optical signal (S signal).

The first semiconductor chip ISS of the imaging apparatus IS can include various other circuits, other than the above-described vertical driving unit 8, as components of a readout circuit for reading out the signals from the light receiving pixels 120, the first light shielded pixels 131, and the second light shielded pixels 132 in the pixel region 1. For example, a column amplifier circuit 4, a column comparator circuit 5, a column memory circuit 6, a horizontal driving circuit 7, a column amplifier driving circuit 9, a column comparator driving circuit 10, a column memory driving circuit 11, a timing generator 12, a data signal processing unit 13, and an output circuit 14 can be included as the circuits. A column AD conversion circuit can be formed by the column comparator driving circuit 10 and the column memory driving circuit 11. The output circuit 14 can be a low voltage differential signal (LVDS) output circuit.

After a signal (the N signal or the S signal) that is output from the pixel region 1 through the corresponding column signal line V(i) (i=1 to n) of each column has been supplied to the column amplifier circuit 4 and amplified by the column amplifier circuit 4, the signal is supplied to the column comparator circuit 5 and is converted into a digital signal by the column comparator circuit 5. The digital signal (the N signal or the S signal) is stored in the column memory circuit 6. Each digital signal stored in the column memory circuit 6 is sequentially output to the data signal processing unit 13 in accordance with the driving control signal supplied from the horizontal driving circuit 7. The data signal processing unit 13 processes each supplied digital signal. The output circuit 14 outputs the signal processed by the data signal processing unit 13 to the outside of the first semiconductor chip ISS. The timing generator 12 supplies a control signal to the horizontal driving circuit 7 and the vertical driving unit 8. A driving signal, a bias voltage, and the like are supplied by the column amplifier driving circuit 9, the column comparator driving circuit 10, and the column memory driving circuit 11 to the column amplifier circuit 4, the column comparator circuit 5, and the column memory circuit 6, respectively.

Figure 2:
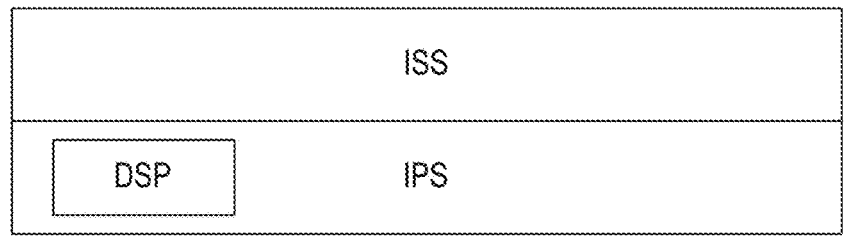
FIG. 2 is a view showing an example of the arrangement of the imaging apparatus.

As schematically shown in FIG. 2, the imaging apparatus IS can include an arrangement in which the first semiconductor chip ISS and a second semiconductor chip IPS have been stacked. The first semiconductor chip ISS can include the arrangement schematically shown in FIG. 1. The second semiconductor chip IPS can include a processor DSP (a digital signal processor) that processes each signal output from the first semiconductor chip ISS (more specifically, the output circuit 14). The processor DSP can process the signal of the light receiving pixel 120 based on the signal of the first light shielded pixel 131 and the signal of the second light shielded pixel 132. More specifically, the processor DSP can process a signal corresponding to the signal of the light receiving pixel 120 based on the signal corresponding to the output of the first light shielded pixel 131 and the output of the second light shielded pixel 132. The processor DSP can determine, for example, a correction parameter (correction information) based on a difference between the signal of the first light shielded pixel 131 and the signal of the second light shielded pixel 132, and use the correction parameter to process the signal of the light receiving pixel 120. The correction parameter can include, for example, information for correcting shading. Shading depends on, for example, the temperature, and the difference between the signal corresponding to the output of the first light shielded pixel 131 and the signal corresponding to the output of the second light shielded pixel 132 can be correlated with respect to the temperature. Hence, shading that is dependent on the temperature can be corrected by determining the correction parameter for shading correction based on the difference between the signal corresponding to the output of the first light shielded pixel 131 and the signal corresponding to the output of the second light shielded pixel 132. Note that the signals corresponding to the outputs of the first light shielded pixel 131 and the second light shielded pixel 132 to be used for processing such as correction or the like can be analog pixel signals output to the corresponding column signal line from the first light shielded pixel 131 and the second light shielded pixel 132. However, the present invention is not limited to this. For example, the signals corresponding to the outputs from the first light shielded pixel 131 and the second light shielded pixel 132 to be used for correction may be digital pixel signals obtained by AD-converting the analog pixel signals or may be pixel data obtained by digitally processing the digital analog pixel signals. The correction by the correction parameter is not limited to that performed to correct unevenness such as shading correction. Corrections such as white balance adjustment, brightness adjustment, gamma correction, and the like may be performed to entirely or partially correct the pixel data forming the image. The correction is not limited to a correction using the correlation of the temperature and the difference between the signal corresponding to the output of the first light shielded pixel 131 and the signal corresponding to the output of the second light shielded pixel 132, and may be a correction that uses the correlation of the difference between the signals output from the first light shielded pixel and the second light shielded pixel and the warping of the semiconductor chip, or a correction that uses the correlation of the difference between the signals output from the first light shielded pixel and the second light shielded pixel and the change in the power supply voltage driving the pixel circuit, the peripheral circuits and the like.

Depending on the structure of the first light shielded pixel 131 and second light shielded pixel 132, a significant difference cannot be obtained between the signal of the first light shielded pixel 131 and the signal of the second light shielded pixel 132, and the correction parameter may not be appropriately determined as a result. The first embodiment presents a structure of the first light shielded pixel 131 and the second light shielded pixel 132 that is advantageous in obtaining a significant difference between the signal of the first light shielded pixel 131 and the signal of the second light shielded pixel 132.

Figure 3:
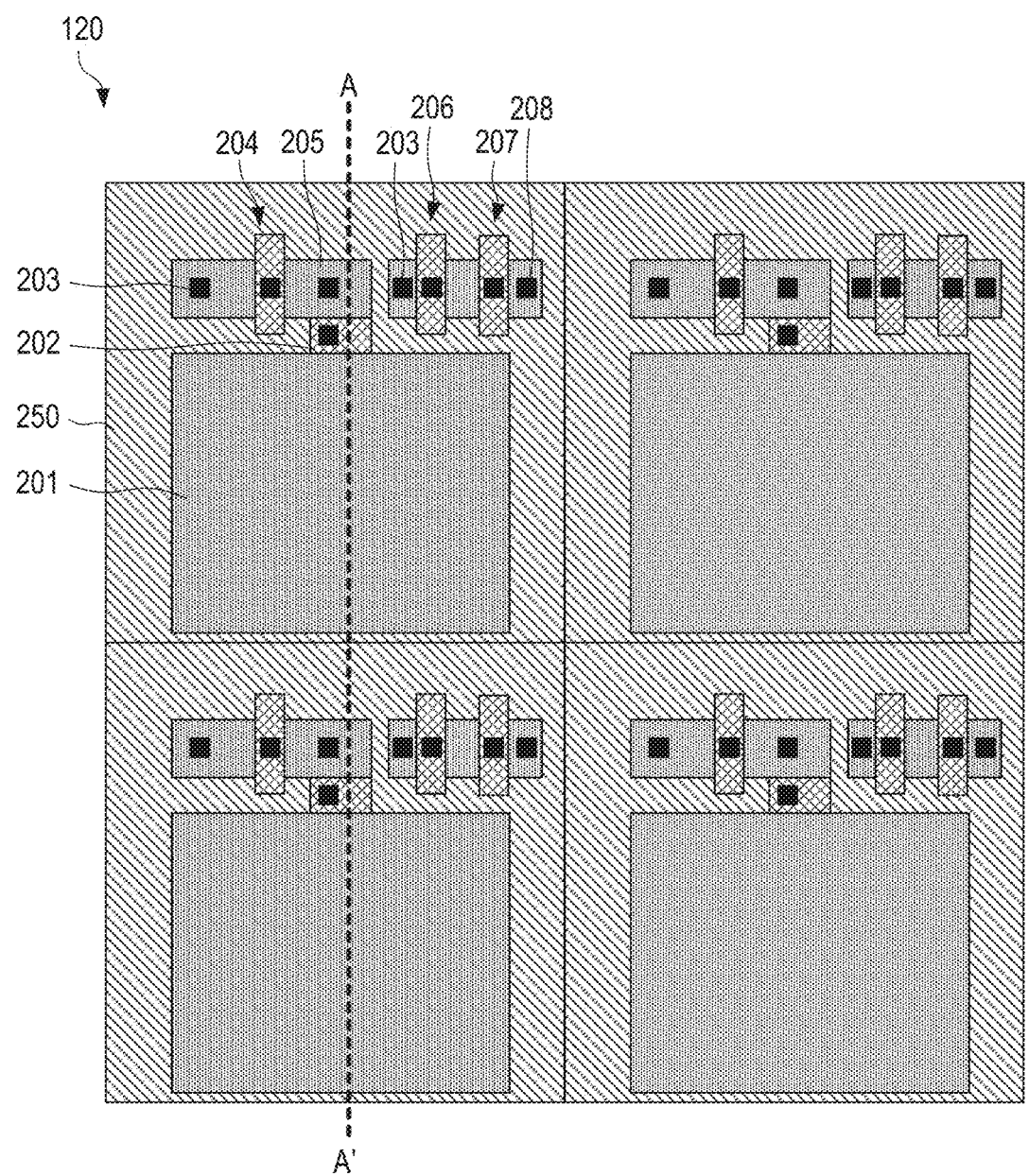
FIG. 3 is a plan view of light receiving pixels of the imaging apparatus according to the first embodiment.

FIG. 3 shows a plan view of the light receiving pixels 120. Four light receiving pixels 120 are shown in FIG. 3. Each light receiving pixel 120 can include a photoelectric conversion element 201, a transfer transistor 202, a pixel power supply 203, a reset transistor 204, a charge-voltage converter 205, an amplification transistor 206, a row selection transistor 207, a column signal line 208, and an element isolation structure 250. The photoelectric conversion element 201 includes a charge accumulation region, and the charges generated by photoelectric conversion and accumulated in the charged accumulation in the charge accumulation region are transferred to the charge-voltage converter 205 via the transfer transistor 202. The charge accumulation region functions as the source of the transfer transistor 202, and the charge-voltage converter 205 forms the drain of the transfer transistor 202. The charge-voltage converter 205 is electrically connected to the gate of the amplification transistor 206. The source of the amplification transistor 206 is electrically connected to the column signal line 208 via the row selection transistor 207. The element isolation structure 250 electrically isolates elements such as the photoelectric conversion element 201, the transfer transistor 202, the pixel power supply 203, the reset transistor 204, the charge-voltage converter 205, the amplification transistor 206, the row selection transistor 207, and the like from each other. Also, the element isolation structure 250 of each light receiving pixel 120 electrically isolates the light receiving pixel 120 from other pixels (the first light shielded pixels 131, the second light shielded pixels 132, and the other light receiving pixels 120).

Figure 4:
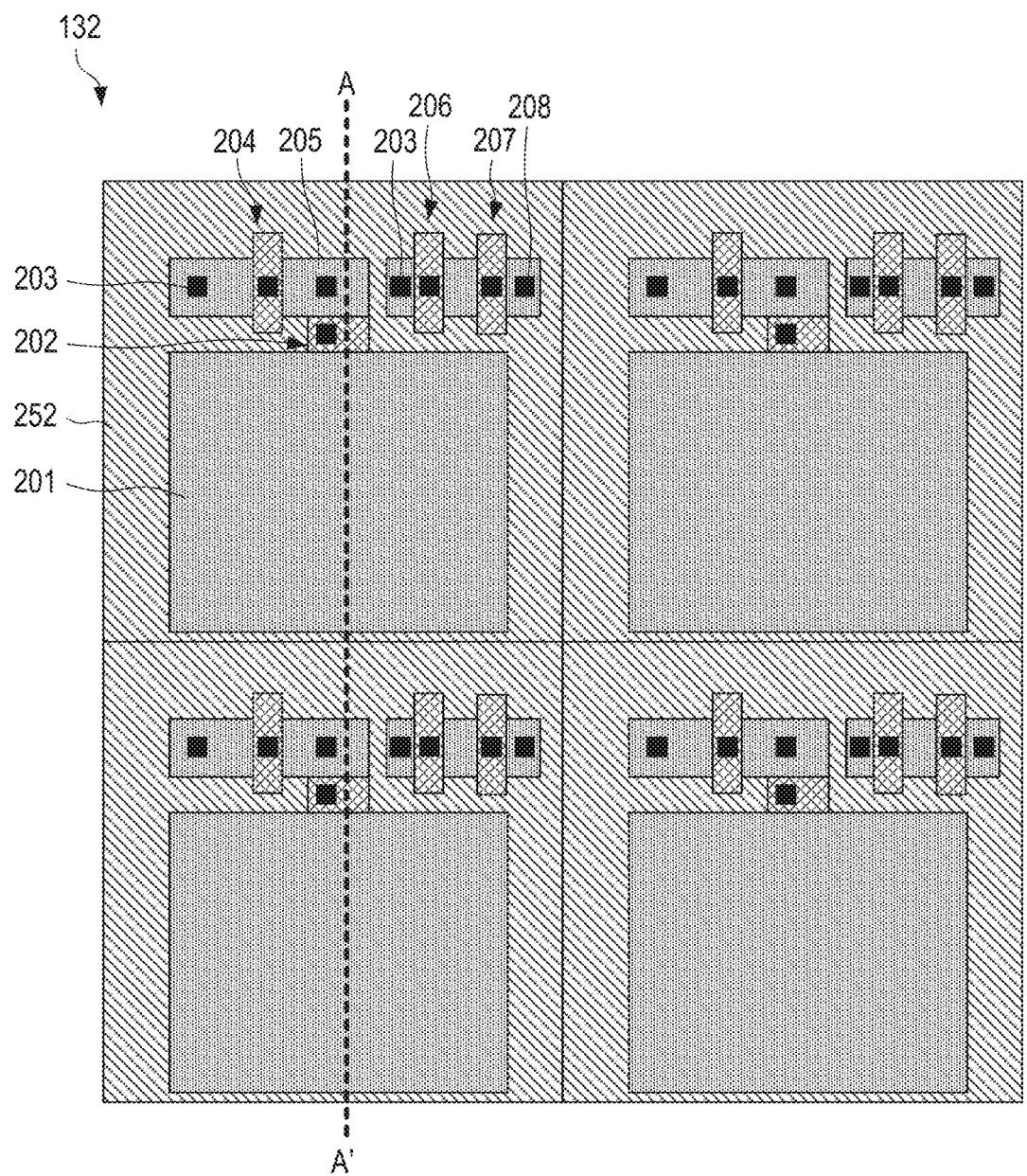
FIG. 4 is a plan view of second light shielded pixels (OB pixels) of the imaging apparatus according to the first embodiment.

FIG. 4 is a plan view of the second light shielded pixels (OB pixels) 132. Four second light shielded pixels 132 are shown in FIG. 4. Each second light shielded pixel 132 can include the photoelectric conversion element 201, the transfer transistor 202, the pixel power supply 203, the reset transistor 204, the charge-voltage converter 205, the amplification transistor 206, the row selection transistor 207, the column signal line 208, and an element isolation structure 252. The photoelectric conversion element 201 includes a charge accumulation region, and the charges generated due to noise such as a dark current or the like and accumulated in the charge accumulation region are transferred to the charge-voltage converter 205 via the transfer transistor 202. The charge accumulation region functions as the source of the transfer transistor 202, and the charge-voltage converter 205 forms the drain of the transfer transistor 202. The charge-voltage converter 205 is electrically connected to the gate of the amplification transistor 206. The source of the amplification transistor 206 is electrically connected to the column signal line 208 via the row selection transistor 207. The element isolation structure 252 electrically isolates elements such as the photoelectric conversion element 201, the transfer transistor 202, the pixel power supply 203, the reset transistor 204, the charge-voltage converter 205, the amplification transistor 206, the row selection transistor 207, and the like from each other. Also, the element isolation structure 252 of each second light shielded pixel 132 electrically isolates the second light shielded pixel 132 from other pixels (the first light shielded pixels 131, the other second light shielded pixels 132, and the light receiving pixels 120). Other than the fact that the photoelectric conversion element 201 is covered by a light shielded film, each second light shielded pixel 132 can have the same structure as the light receiving pixel 120.

Figure 5:
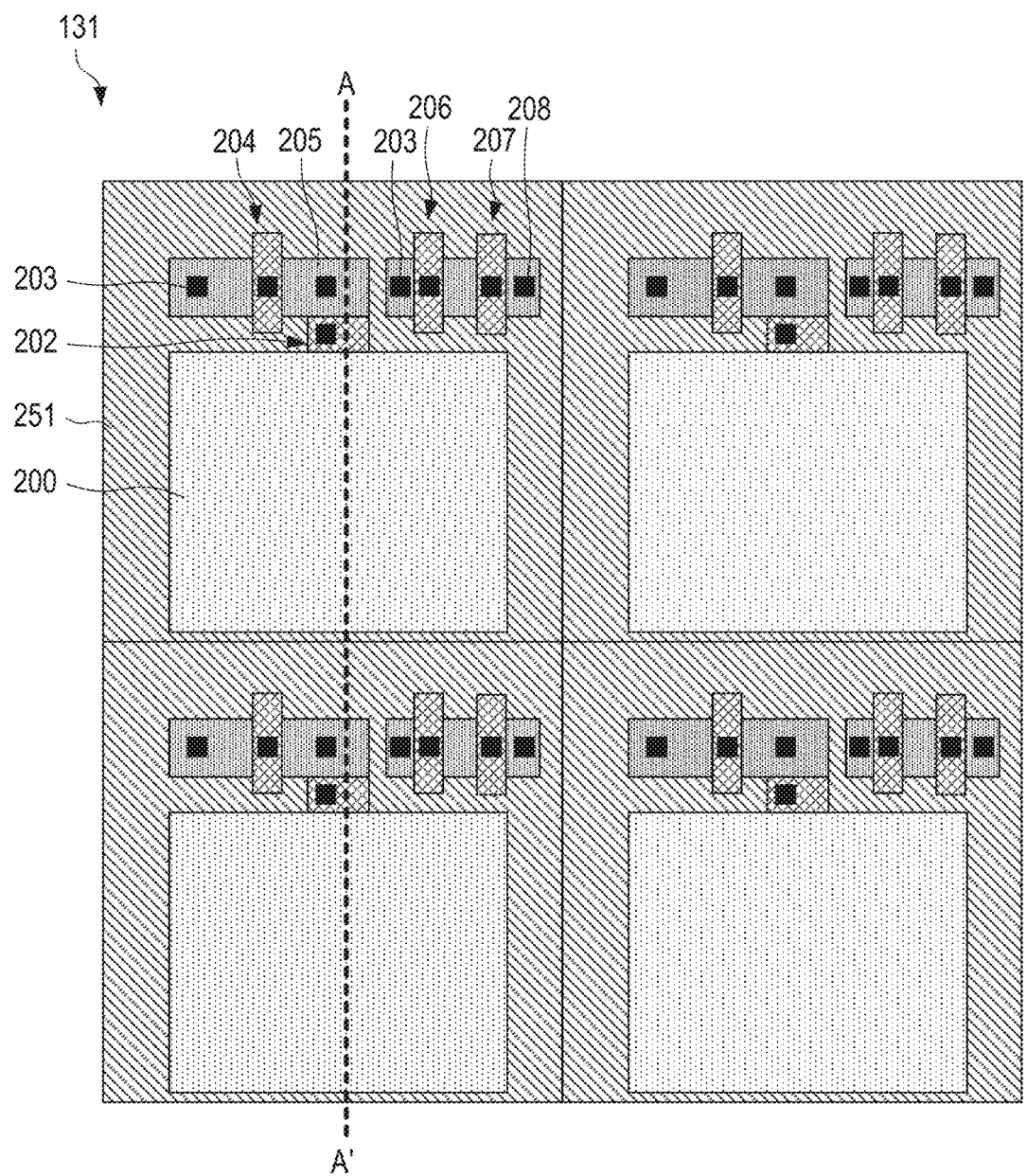
FIG. 5 is a plan view of first light shielded pixels (NULL pixel) of the imaging apparatus according to the first embodiment.

FIG. 5 shows the plan view of the first light shielded pixels (NULL pixels) 131. Four first light shielded pixels 131 are shown in FIG. 5. Each first light shielded pixel 131 can include the transfer transistor 202, the pixel power supply 203, the reset transistor 204, the charge-voltage converter (floating diffusion) 205, the amplification transistor 206, the row selection transistor 207, the column signal line 208, and an element isolation structure 251. A source 200 of the transfer transistor 202 can accumulate charges generated due to noise such as a dark current or the like. The charges accumulated in the source 200 are transferred to the charge-voltage converter 205 via the transfer transistor 202. The charge-voltage converter 205 is electrically connected to the gate of the amplification transistor 206. The source of the amplification transistor 206 is electrically connected to the column signal line 208 via the row selection transistor 207. The element isolation structure 251 electrically isolates elements such as the transfer transistor 202 (including the source 200), the pixel power supply 203, the reset transistor 204, the charge-voltage converter 205, the amplification transistor 206, the row selection transistor 207, and the like from each other. Also, the element isolation structure 251 of each first light shielded pixel 131 electrically isolates the first light shielded pixel 131 from other pixels (the other first light shielded pixels 131, the second light shielded pixels 132, and the light receiving pixels 120). Other than the fact that the element isolation structure 251 has a structure different from the structure of the element isolation structure 252 of each second light shielded pixel 132, each first light shielded pixel 131 can have the same structure as the second light shielded pixel 132.

Figure 6:
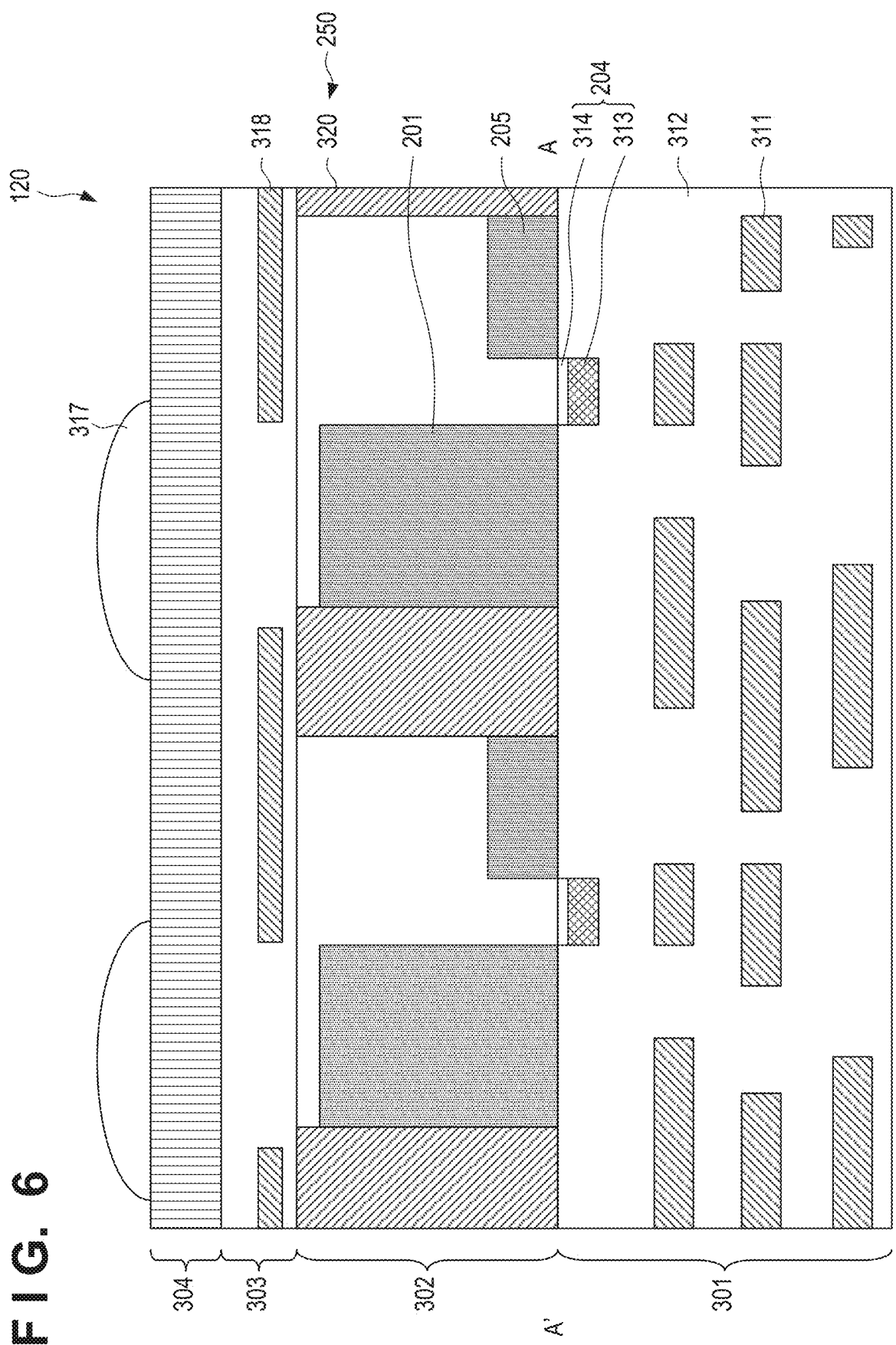
FIG. 6 is a sectional view (taken along a line A-A' in FIG. 3) of the light receiving pixel.

FIG. 6 shows a sectional view of the light receiving pixel 120 taken along a line A-A' in FIG. 3. The element isolation structure 250 of the light receiving pixel 120 can include a DTI (Deep Trench Isolation) 320. The DTI 320 can be formed by filling a vertical trench, which has a high aspect ratio and is formed in a semiconductor substrate 302, with a material (an insulator) that has a refractive index different from the semiconductor substrate 302. The DTI 320 can be formed by, for example, depositing an insulator such as silicon oxide or the like in the vertical trench by chemical vapor deposition (CVD) or the like. Arranging the DTI 320 in the light receiving pixel 120 can suppress the charges generated by the photoelectric conversion element 201 from flowing into an element adjacent to the photoelectric conversion element 201 and becoming the cause of noise or from flowing into an adjacent pixel and generating color mixing.

The photoelectric conversion element 201, the charge-voltage converter 205, the diffusion regions (sources and drains) of the respective transistors 202, 204, 206, 207, and the element isolation structure 250 (the DTI 320) are arranged inside the semiconductor substrate 302. The transfer transistor 202 is formed by a transistor that includes a gate 313 and a gate insulation film 314 arranged between the gate 313 and the semiconductor substrate 302, and in which the source is the charge accumulation region of the photoelectric conversion element 201 and the drain is the charge-voltage converter 205. The gate insulation film 314 can be formed by, for example, silicon oxide. In one example, a wiring structure 301 can be arranged on the side of one surface of the two surfaces of the semiconductor substrate 302, and a light shielded film 318, an insulation film 303, a color filter 304, and an on-chip lens 317 can be arranged on the side of the other surface of the two surfaces of the semiconductor substrate 302. The light shielded film 318 includes an aperture to allow light to enter the photoelectric conversion element 201. The light shielded film 318 can be arranged so as to prevent the light from entering an element other than the photoelectric conversion element 201.

The wiring structure 301 can include a wiring layer (wiring pattern) 311 and an interlayer insulation film 312. The wiring layer 311 can be formed by, for example, an electrically conductive material mainly made of aluminum or copper. The interlayer insulation film 312 can be made of silicon oxide, silicon nitride, or silicon oxynitride.

Figure 7:
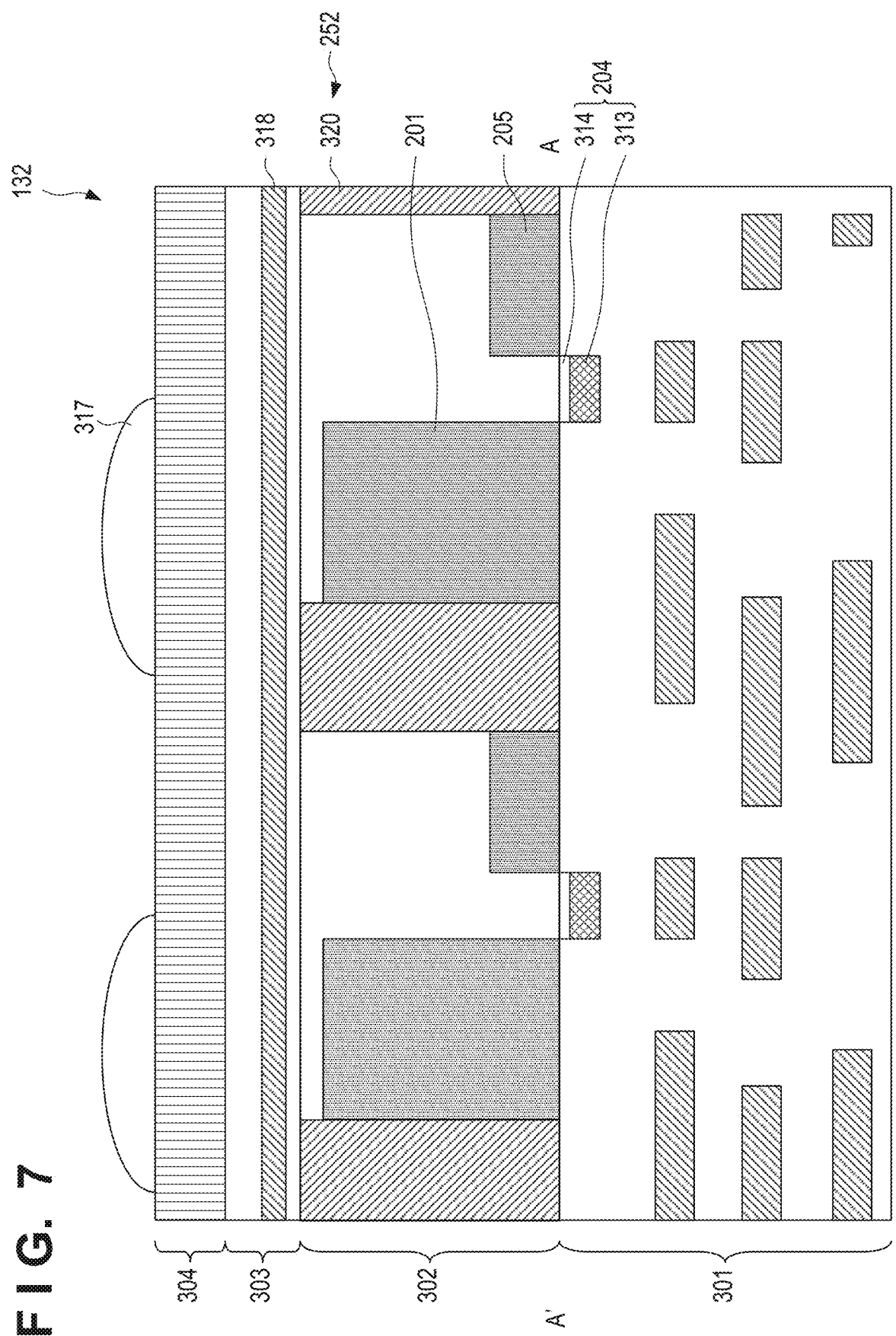
FIG. 7 is a sectional view (taken along a line A-A' in FIG. 4) of the second light shielded pixel (OB pixel)

FIG. 7 shows a sectional view of the second light shielded pixel 132 (OB pixel) taken along a line A-A' in FIG. 4. The element isolation structure 252 of the second light shielded pixel 132 can include the DTI 320. The second light shielded pixel 132 can have the same structure as the light receiving pixel 120 other than the fact that the photoelectric conversion element 201 is covered by the light shielded film 318.

Figure 8:
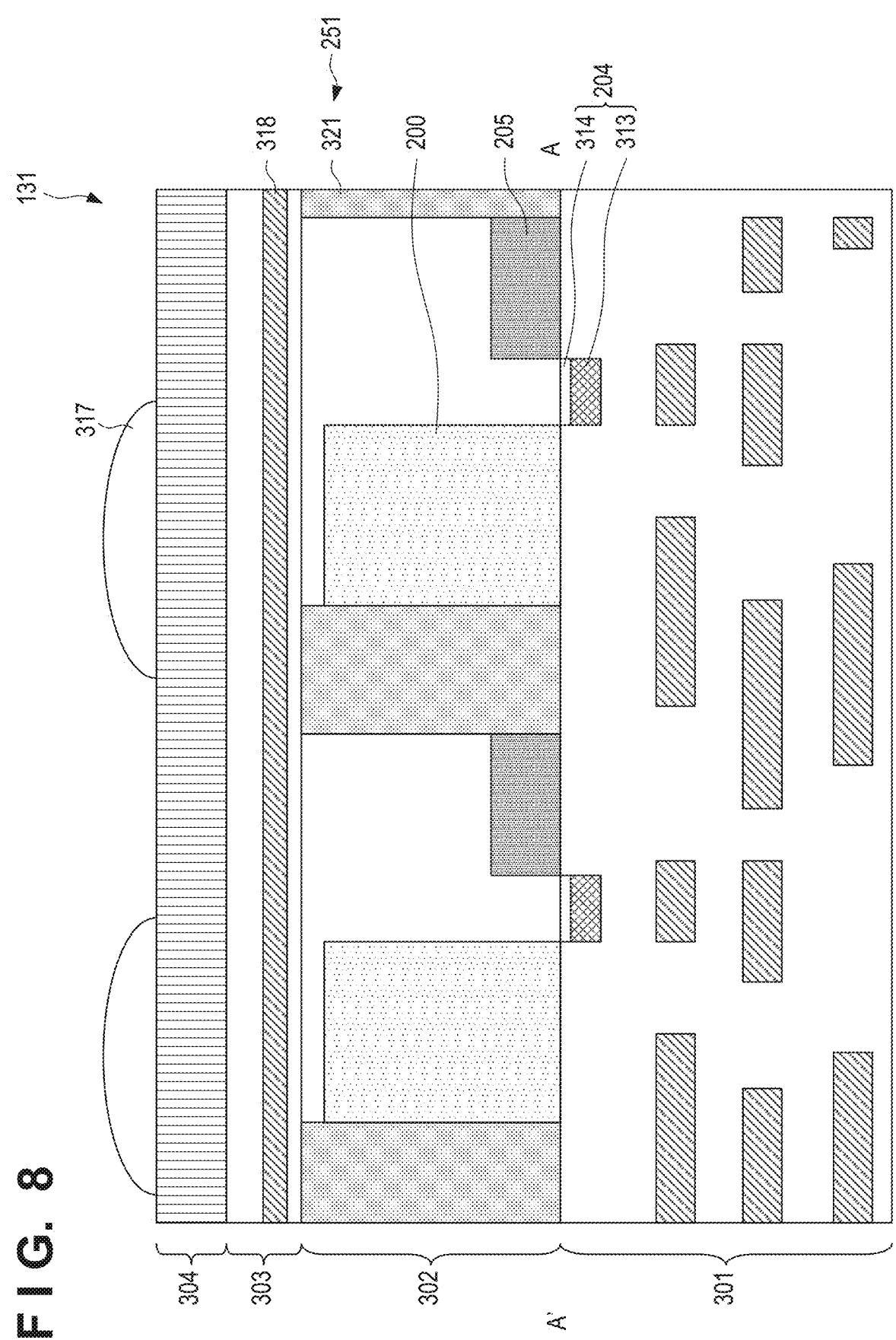
FIG. 8 is a sectional view (taken along a line A-A' in FIG. 5) of the first light shielded pixel (NULL pixel)

FIG. 8 shows a sectional view of the first light shielded pixel 131 (NULL pixel) taken along a line A-A' in FIG. 5. The element isolation structure 251 of the first light shielded pixel 131 can include a diffusion isolation region 321. The element isolation structure 251 of the first light shielded pixel 131 differs from the element isolation structure 252 of the second light shielded pixel 132 formed by the DTI 320 in the point that the element isolation structure 251 is formed by the diffusion isolation region 321. For example, in a case in which the source 200 and the charge-voltage converter 205 are of a first conductivity type, the diffusion isolation region 321 can be of a second conductivity type. In this case, the first conductivity type and the second conductivity type are conductivity types which are different from each other, and if one is the p-type, the other will be the n-type.

The first light shielded pixel 131 can be defined as pixel that is a light shielded pixel and a pixel which does not include the charge accumulation region or a pixel which does not include a photoelectric conversion element. The first light shielded pixel 131 and the second light shielded pixel 132 can be relatively defined based on the differences between their respective characteristics. For example, the impurity concentration of the source 200 of the transfer transistor 202 of the first light shielded pixel 131 is lower than the impurity concentration of the source (the charge accumulation region of the photoelectric conversion element 201) of the transfer transistor 202 of the second light shielded pixel 132 (OB pixel).

In a case in which DTI is used as the element isolation structure, a dark current can be generated on the interface between the semiconductor region (for example, the source 200) and the DTI. A significant difference between the signal of the first light shielded pixel 131 and the second light shielded pixel 132 cannot be obtained if this dark current is large. This will make it difficult to appropriately determine the correction parameter for correcting the signal of the light receiving pixel 120 based on the difference between the signal of the first light shielded pixel 131 and the signal of the second light shielded pixel 132. In the first embodiment, the dark current noise due to the presence of DTI will be reduced by forming the element isolation structure 251 of the first light shielded pixel 131 by the diffusion isolation region 321. As a result, the dark current component included in the signal output to the column signal line from the transfer transistor 202 can be reduced. Hence, the correction parameter for correcting the signal of the light receiving pixel 120 based on the difference between the signal of the first light shielded pixel 131 and the signal of the second light shielded pixel 132 can be appropriately determined. This will allow a high-quality image to be obtained.

In a structure in which the element isolation structure 251 of the first light shielded pixel 131 is formed by the diffusion isolation region 321 and the element isolation structure 252 of the second light shielded pixel 132 is formed by the DTI 320, the noise output from the first light shielded pixel 131 can be smaller than the noise output from the second light shielded pixel 132. In this case, a structure in which the element isolation structure 251 of the first light shielded pixel 131 is formed by the diffusion isolation region 321 and the element isolation structure 252 of the second light shielded pixel 132 is formed by the DTI 320 is an example of a structure in which the element isolation structure 251 does not include an insulator and the element isolation structure 252 includes an insulator.

The area of an interface between the semiconductor region and the insulator in the first light shielded pixel 131 is preferably different from the area of an interface between the semiconductor region and the insulator in the second light shielded pixel 132. For example, it is preferable for the area of the interface between the semiconductor region and the insulator in the first light shielded pixel 131 to be smaller than the area of the interface between the semiconductor region and the insulator in the second light shielded pixel 132. Alternatively, it is preferable for the volume of the semiconductor region of the first light shielded pixel 131 to be larger than the volume of the semiconductor region of the second light shielded pixel 132. In this case, the semiconductor region represents a portion which is formed by a semiconductor in the semiconductor substrate 302. Also, the insulator represents the insulation film 303, the interlayer insulation film of the wiring structure 301, the gate insulation film 314, the DTI 320, or the like. The interface between the semiconductor region and the insulator can be the cause of dark current generation. Hence, the reduction of the semiconductor region and the insulator is advantageous for reducing the noise cause by the dark current.

In the first embodiment, the element isolation structure 251 of the first light shielded pixel 131 includes a first element isolation (the diffusion isolation region 321) that electrically isolates adjacent first light shielded pixels 131 from each other. Also, the element isolation structure 252 of the second light shielded pixel 132 includes a second element isolation (the DTI 320) that electrically isolates adjacent second light shielded pixels 132 from each other. In this case, the first element isolation and the second element isolation have structures which are different from each other.

Although FIGS. 6, 7, and 8 have shown sectional views of the imaging apparatus IS which is formed as a back-side illumination imaging apparatus, the imaging apparatus IS may be formed as a front-side illumination imaging apparatus. This is applicable to all of the embodiments to be described below.

Figure 9:
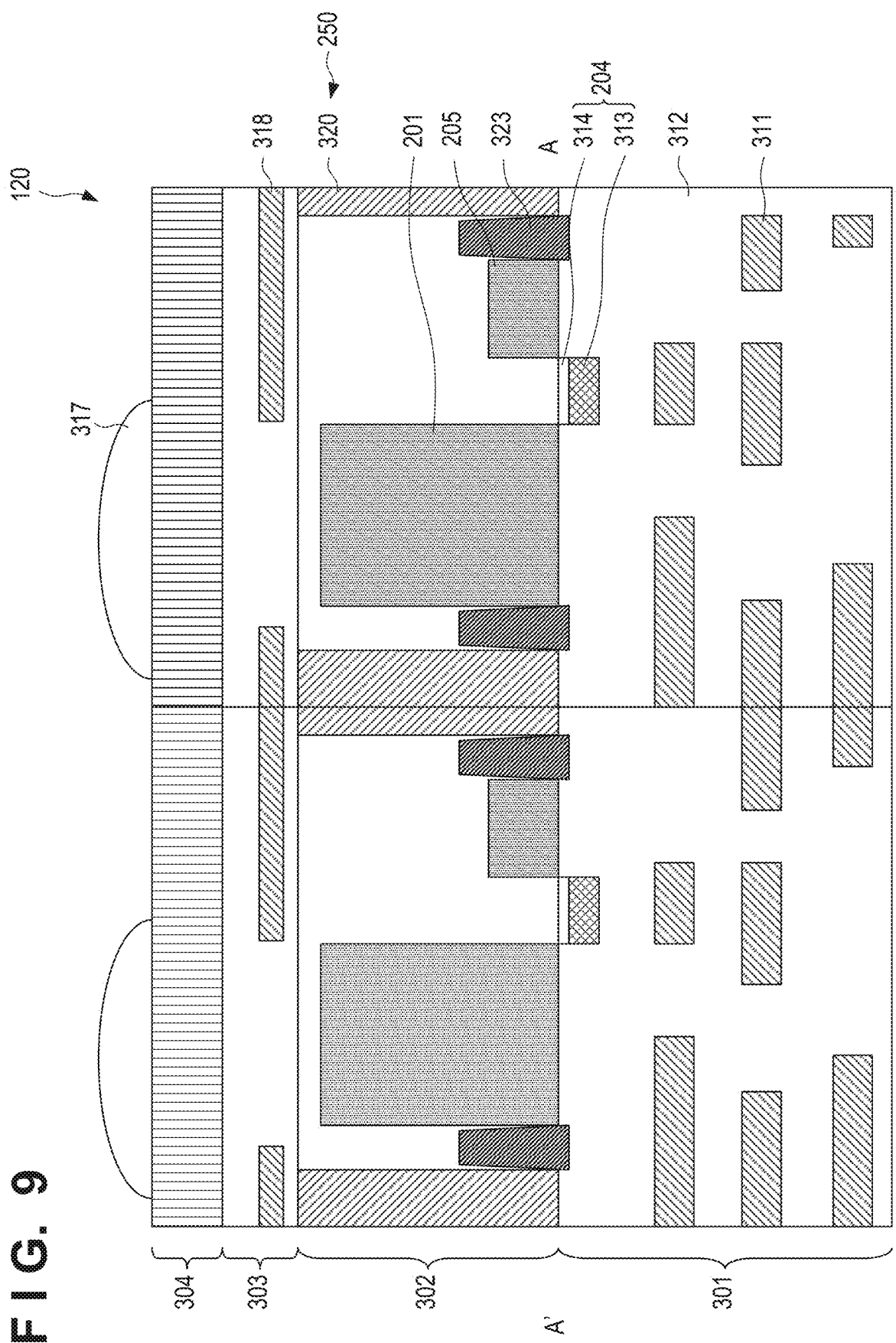
FIG. 9 is a sectional view (taken along a line A-A' in FIG. 3) of a light receiving pixel of an imaging apparatus according to the second embodiment.
Figure 10:
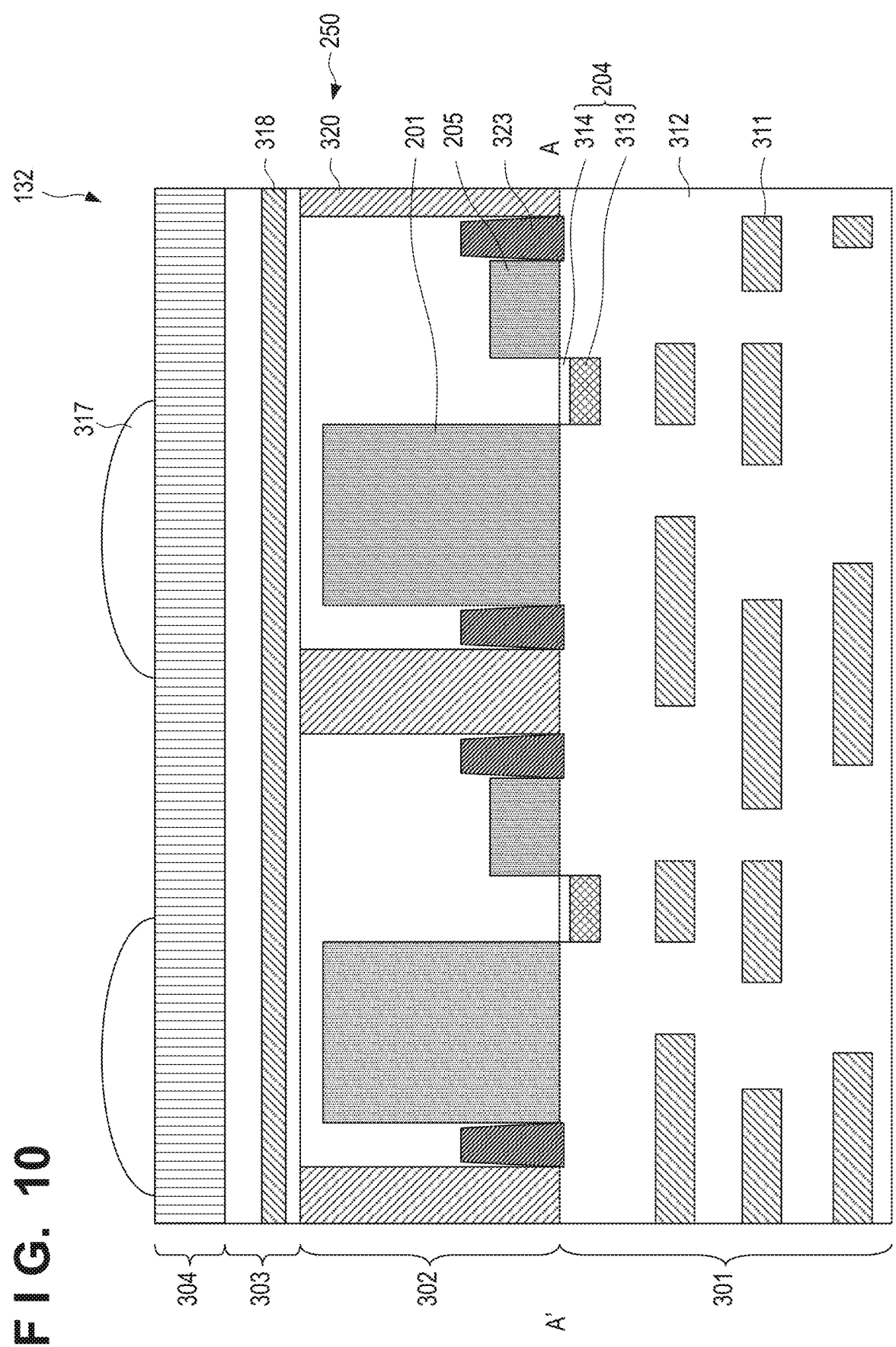
FIG. 10 is a sectional view (taken along a line A-A' in FIG. 4) of a second light shielded pixel (OB pixel) of the imaging apparatus according to the second embodiment.

An imaging apparatus IS according to the second embodiment will be described hereinafter with reference to FIGS. 9 and 10. Matters not mentioned in the second embodiment can follow those of the first embodiment. FIG. 9 shows a sectional view of a light receiving pixel 120 taken along a line A-A' in FIG. 3. An element isolation structure 250 of the light receiving pixel 120 includes a DTI 320 and an STI 323. FIG. 10 shows a sectional view of a second light shielded pixel 132 (OB pixel) taken along a line A-A' in FIG. 4. Other than the fact that a photoelectric conversion element 201 is covered by a light shielded film, the second light shielded pixel 132 can have the same structure as the light receiving pixel 120. A first light shielded pixel 131 according to the second embodiment can have the same structure as the first light shielded pixel 131 according to the first embodiment.

In the second embodiment, the element isolation structure 250 of the light receiving pixel 120 and an element isolation structure 252 of the second light shielded pixel 132 each include the DTI 320 and the STI (Shallow Trench Isolation) 323. The STI 323 can be formed by filling a vertical trench, which has a low aspect ratio and is formed in a semiconductor substrate 302, with a material (an insulator) that has a refractive index different from the semiconductor substrate 302. The dimension of the STI 323 in the thickness direction of the semiconductor substrate 302 can be equal to or less than ½ of the thickness of the semiconductor substrate 302.

In one example, the DTI 320 (first element isolation) of the element isolation structure 250 of the light receiving pixel 120 electrically isolates the light receiving pixel 120 from other pixels (the first light shielded pixels 131, the second light shielded pixels 132, and the other light receiving pixels 120). Also, in one example, the STI 323 (second element isolation) of the element isolation structure 250 of the light receiving pixel 120 electrically isolates a plurality of elements in the light receiving pixel 120 from each other. The plurality of elements can be the photoelectric conversion element 201, a transfer transistor 202, a pixel power supply 203, a reset transistor 204, a charge-voltage converter 205, an amplification transistor 206, a row selection transistor 207, and the like.

The second embodiment has, other than the effects of the first embodiment, an effect of further reducing the dark current while preventing color mixing between adjacent light receiving pixels 120. Although each of the element isolation structures 250 and the element isolation structure 252 has both the DTI and the STI in the second embodiment, this is merely an example. For example, the element isolation structures 250 and 252 of the light receiving pixel 120 and the second light shielded pixel 132, respectively, may be formed only by the STI.

Figure 11:
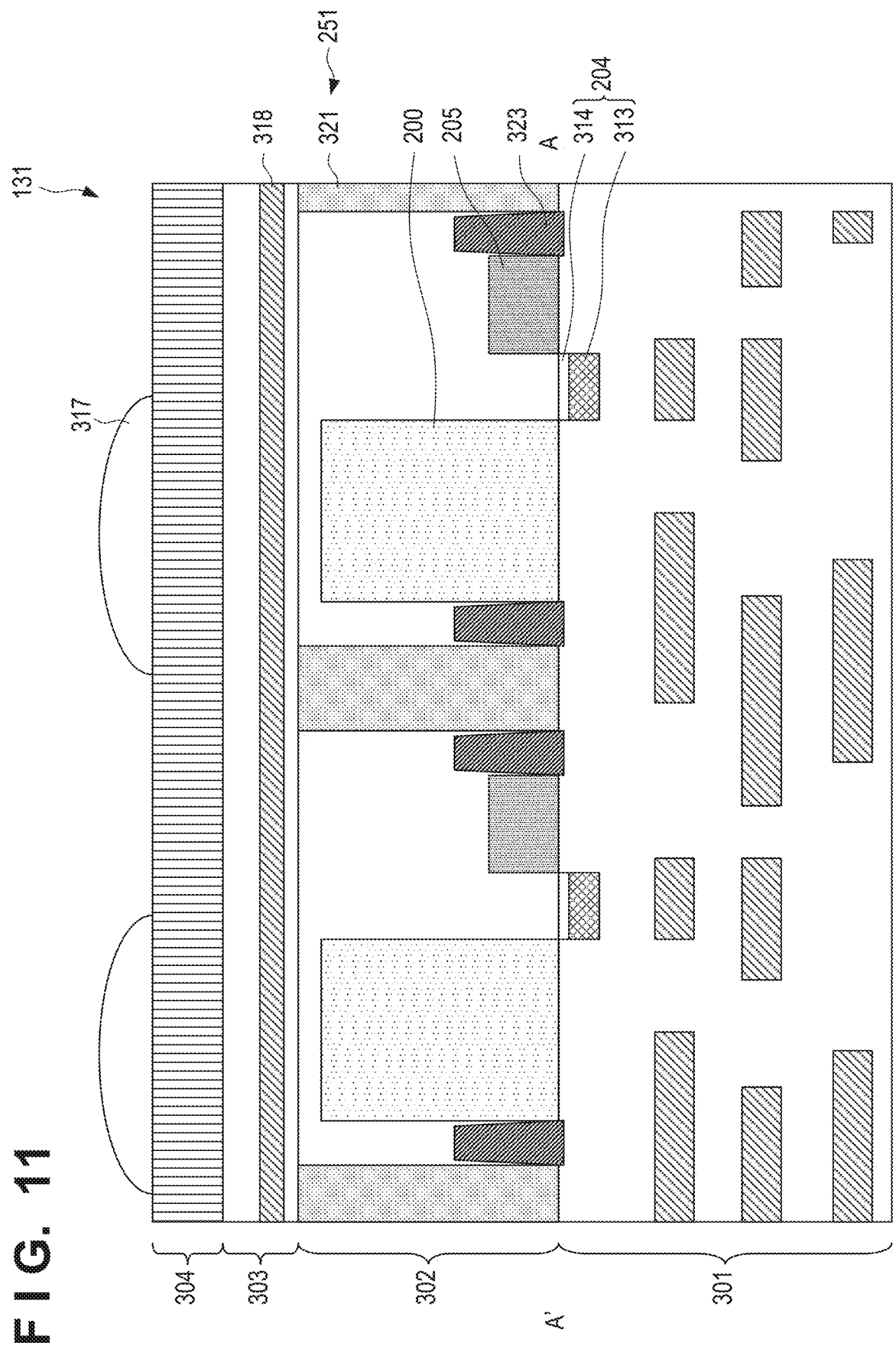
FIG. 11 is a sectional view (taken along a line A-A' in FIG. 5) of a first light shielded pixel (NULL pixel) of an imaging apparatus according to the third embodiment.

An imaging apparatus IS according to the third embodiment will be described with reference to FIG. 11. Matters not mentioned in the third embodiment can follow those of the first embodiment. FIG. 11 shows a sectional view of a first light shielded pixel 131 (NULL pixel) taken along a line A-A' in FIG. 5. The third embodiment differs from the first embodiment in that an element isolation structure 251 of the first light shielded pixel 131 includes a diffusion isolation region 321 and an STI 323. In one example, the diffusion isolation region 321 of the element isolation structure 251 of the first light shielded pixel 131 electrically separates the first light shielded pixel 131 from other pixels (the other first light shielded pixels 131, second light shielded pixels 132, and light receiving pixels 120). Also, in one example, the STI 323 of the element isolation structure 251 of the first light shielded pixel 131 electrically isolates a plurality of elements in the first light shielded pixel 131 from each other. The plurality of elements can be a photoelectric conversion element 201, a transfer transistor 202, a pixel power supply 203, a reset transistor 204, a charge-voltage converter 205, an amplification transistor 206, a row selection transistor 207, and the like. A source 200 of the transfer transistor 202 can be arranged between the charge-voltage converter 205 and the diffusion isolation region 321, and the STI 323 can be arranged between the diffusion isolation region 321 and the source 200. The width of the diffusion isolation region 321 has temperature dependence which is larger than the temperature dependence of the width of the STI 323. Hence, the temperature dependence of the width of the diffusion isolation region 321 can cause the dark current to have temperature dependence.

In the third embodiment, the element isolation structure 251 of the first light shielded pixel 131 includes a first element isolation (the STI 323) that electrically separates the plurality of elements in the first light shielded pixel 131 from each other. An element isolation structure 252 of the second light shielded pixel 132 includes a second element isolation (the STI 323) that electrically isolates the plurality of elements in the second light shielded pixel 132 from each other. The plurality of elements can be the photoelectric conversion element 201, the transfer transistor 202, the pixel power supply 203, the reset transistor 204, the charge-voltage converter 205, the amplification transistor 206, the row selection transistor 207, and the like. The first element isolation and the second element isolation have structures which are different from each other.

The third embodiment has, other than the effects of the first embodiment, an effect of reducing the temperature dependence of the dark current of each first light shielded pixel 131. Furthermore, the third embodiment has an effect of suppressing variation in the dimension of an active region of each first light shielded pixel 131. As a result, a difference between the signal of the first light shielded pixel 131 and the signal of the second light shielded pixel 132 can be obtained accurately, thus allowing the signal of the light receiving pixel 120 to be corrected more accurately.

Figure 12:
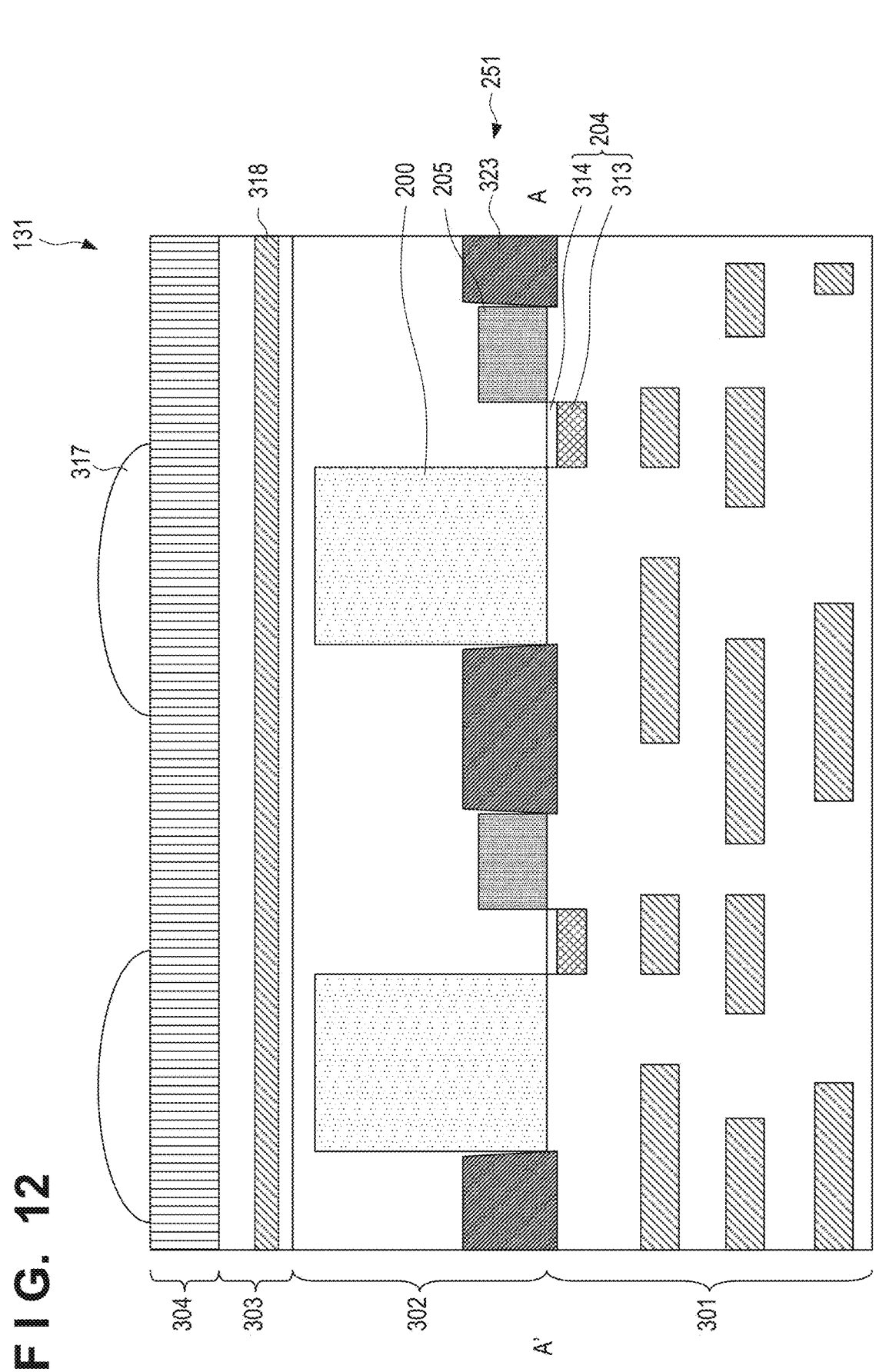
FIG. 12 is a sectional view (taken along a line A-A' in FIG. 5) of a first light shielded pixel (NULL pixel) of an imaging apparatus according to the fourth embodiment.

An imaging apparatus IS according to the fourth embodiment will be described with reference to FIG. 12. Matters not mentioned in the fourth embodiment can follow those of the first embodiment. The fourth embodiment differs from the first embodiment in that an element isolation structure 251 of a first light shielded pixel 131 is formed by an STI 323. FIG. 12 shows a sectional view of the first light shielded pixel 131 (NULL pixel) taken along a line A-A' in FIG. 5. The element isolation structure 251 of the first light shielded pixel 131 is formed by the STI 323. The STI 323 of the element isolation structure 251 of the first light shielded pixel 131 electrically isolates the first light shielded pixel 131 from other pixels (the other first light shielded pixels 131, the second light shielded pixels 132, and the light receiving pixel 120). Also, in one example, the STI 323 of the element isolation structure 251 of the first light shielded pixel 131 electrically isolates a plurality of elements in the first light shielded pixel 131 from each other. The plurality of pixels can be a photoelectric conversion element 201, a transfer transistor 202, a pixel power supply 203, a reset transistor 204, a charge-voltage converter 205, an amplification transistor 206, a row selection transistor 207, and the like.

The width of the diffusion isolation region has temperature dependence which is larger than the temperature dependence of the width of the STI 323. Hence, the temperature dependence of the width of the diffusion isolation region can cause the dark current to have temperature dependence. The fourth embodiment has, other than the effects of the first embodiment, an effect of reducing the temperature dependence of the dark current of the first light shielded pixel 131. Furthermore, the fourth embodiment has an effect of suppressing the variation in dimension of the active region for each first light shielded pixel 131. As a result, a difference between the signal of the first light shielded pixel 131 and the signal of the second light shielded pixel 132 can be obtained accurately, thus allowing the signal of the light receiving pixel 120 to be corrected more accurately.

Figure 13:
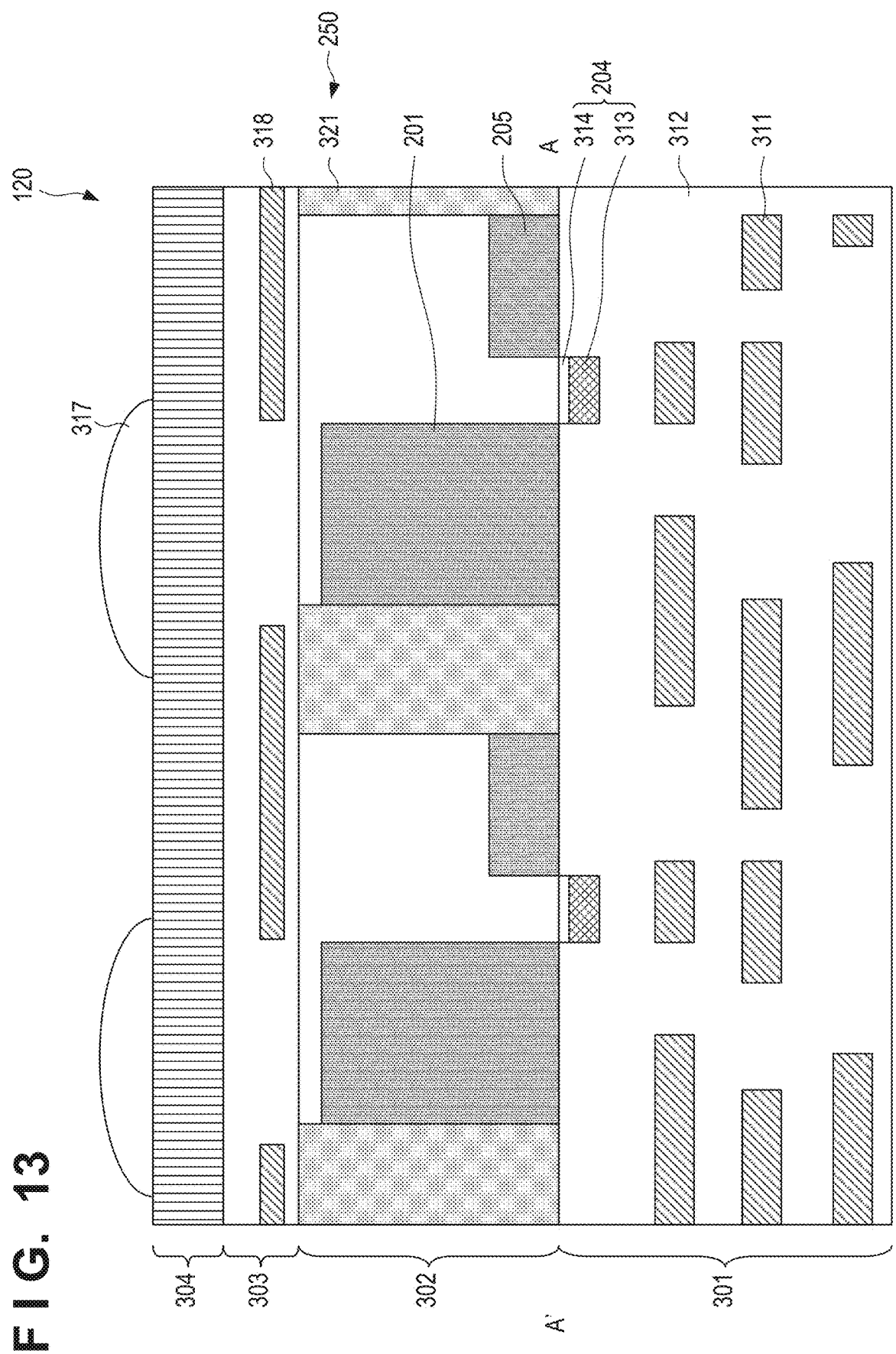
FIG. 13 is a sectional view (taken along a line A-A' in FIG. 3) of a light receiving pixel of an imaging apparatus according to the fifth embodiment.
Figure 14:
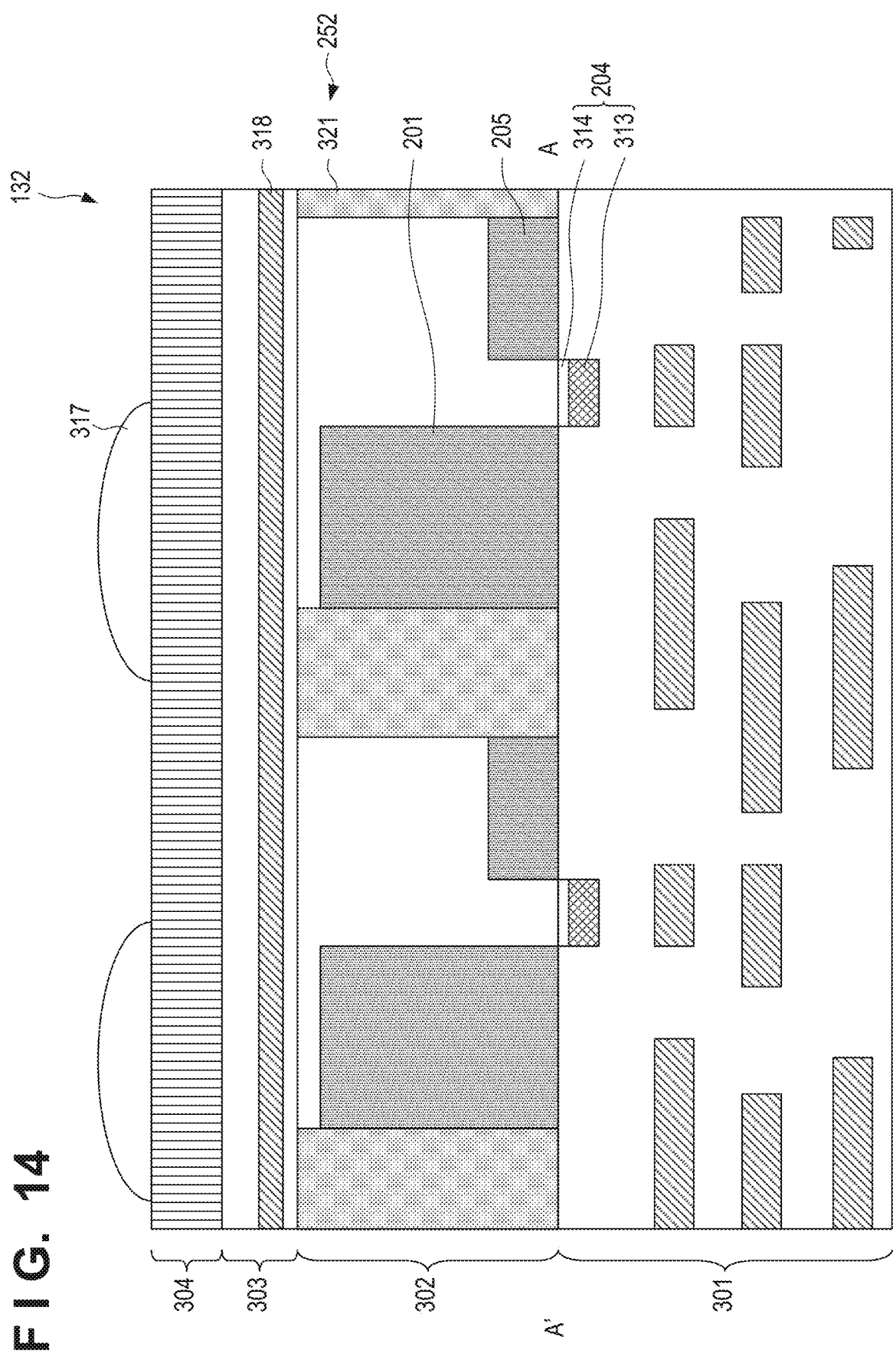
FIG. 14 is a sectional view (taken along a line A-A' in FIG. 4) of a second light shielded pixel (OB pixel) of the imaging apparatus according to the fifth embodiment.
Figure 15:
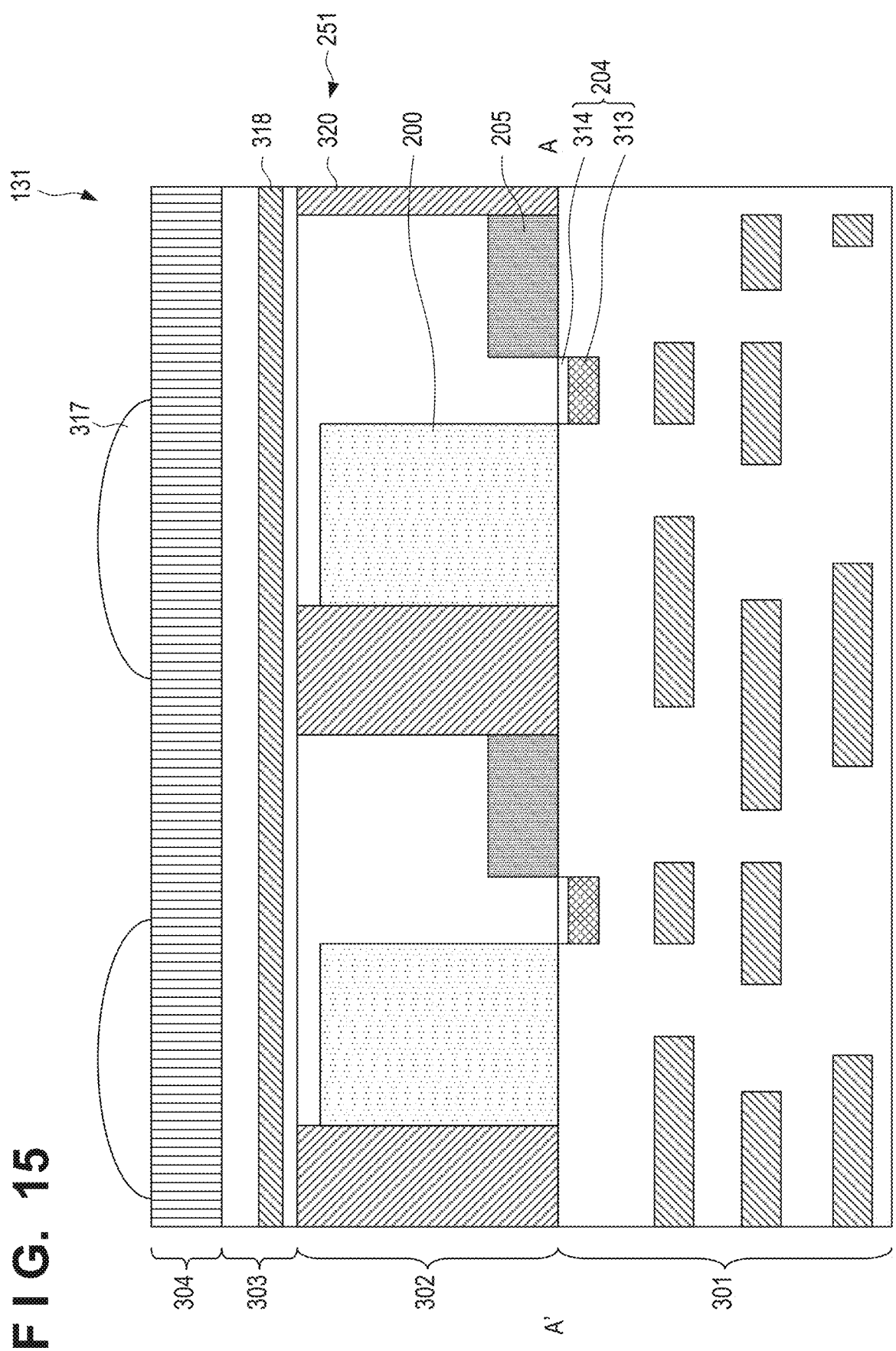
FIG. 15 is a sectional view (taken along a line A-A' in FIG. 5) of a first light shielded pixel (NULL pixel) of the imaging apparatus according to the fifth embodiment.

An imaging apparatus IS according to the fifth embodiment will be described with reference to FIGS. 13 to 15. Matters not mentioned in the fifth embodiment can follow those of the first embodiment. FIG. 13 shows a sectional view of a light receiving pixel 120 taken along a line A-A' in FIG. 3. FIG. 14 shows a sectional view of a second light shielded pixel 132 (OB pixel) taken along a line A-A' in FIG. 4. FIG. 15 shows a sectional view of a first light shielded pixel 131 (NULL pixel) taken along a line A-A' in FIG. 5. The fifth embodiment differs from the first embodiment in that each of an element isolation structure 250 of the light receiving pixel 120 and an element isolation structure 252 of the second light shielded pixel 132 is formed by a diffusion isolation region 321, and an element isolation structure 251 of the first light shielded pixel 131 is formed by a DTI 320.

In the fifth embodiment, for example, even in a case in which a stray light beam has entered the first light shielded pixel 131, the stray light beam will be refracted by the difference between the refractive index of the DTI 320 and the refractive index semiconductor substrate 302 arranged in the first light shielded pixel 131. Hence, it is possible to suppress the stray light beam from entering into a source 200 of a transfer transistor 202. This will allow the dark current noise due to the exposure of the first light shielded pixel 131 to be suppressed. As a result, the difference between the signal of the first light shielded pixel 131 and the signal of the second light shielded pixel 132 can be obtained accurately, thus allowing the signal of the light receiving pixel 120 to be corrected accurately.

Although each of the element isolation structure 250 of the light receiving pixel 120 and the element isolation structure 252 of the second light shielded pixel 132 is formed by the diffusion isolation region 321 in the fifth embodiment, each of the element isolation structure 250 and the element isolation structure 252 may alternatively be formed by an STI.

An imaging apparatus IS according to the sixth embodiment will be described with reference to FIGS. 16 to 21. Matters not mentioned in the sixth embodiment can follow those of the first embodiment. In the sixth embodiment, each of the photoelectric conversion elements of a light receiving pixel 120, a first light shielded pixel 131, and a second light shielded pixel 132 is divided into two photoelectric conversion elements 201 and 211. The division number (the number of photoelectric conversion elements in one pixel) of the photoelectric conversion element of each pixel is not limited to two, and the photoelectric conversion element can be divided into an arbitrary number.

Figure 16:
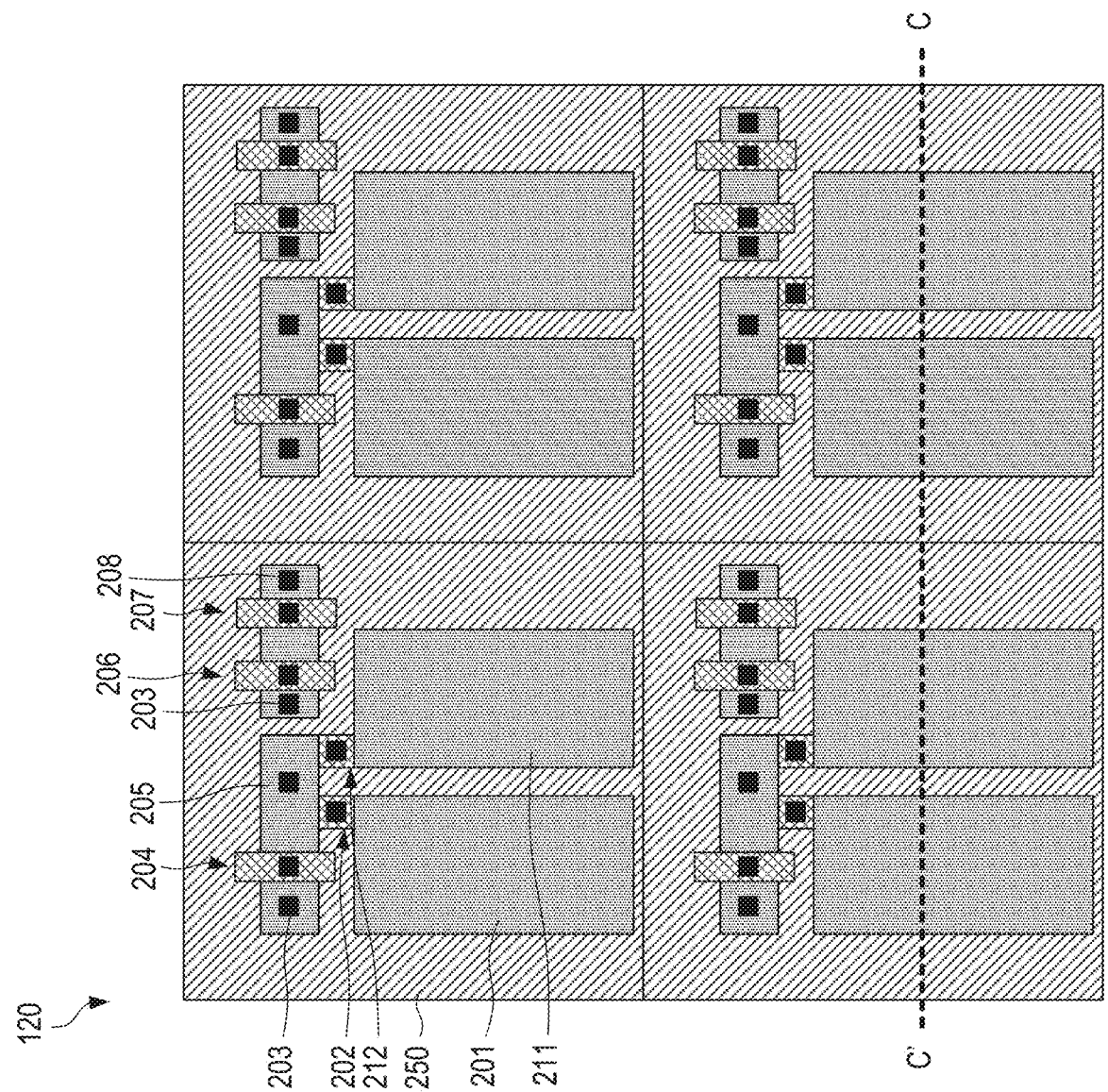
FIG. 16 is a plan view of a light receiving pixel of an imaging apparatus according to the sixth embodiment.
Figure 17:
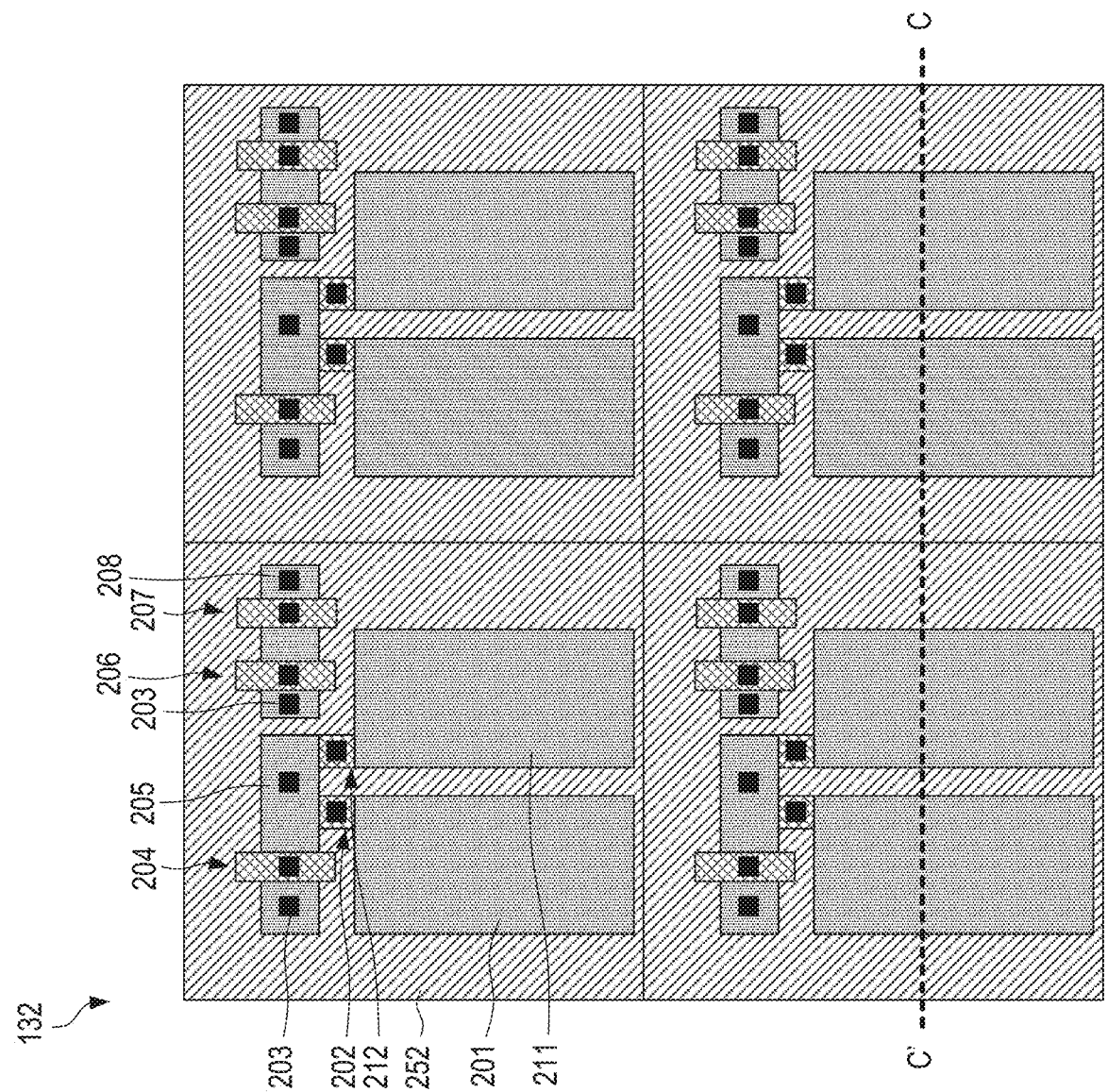
FIG. 17 is a plan view of a second light shielded pixel (OB pixel) of the imaging apparatus according to the sixth embodiment.
Figure 18:
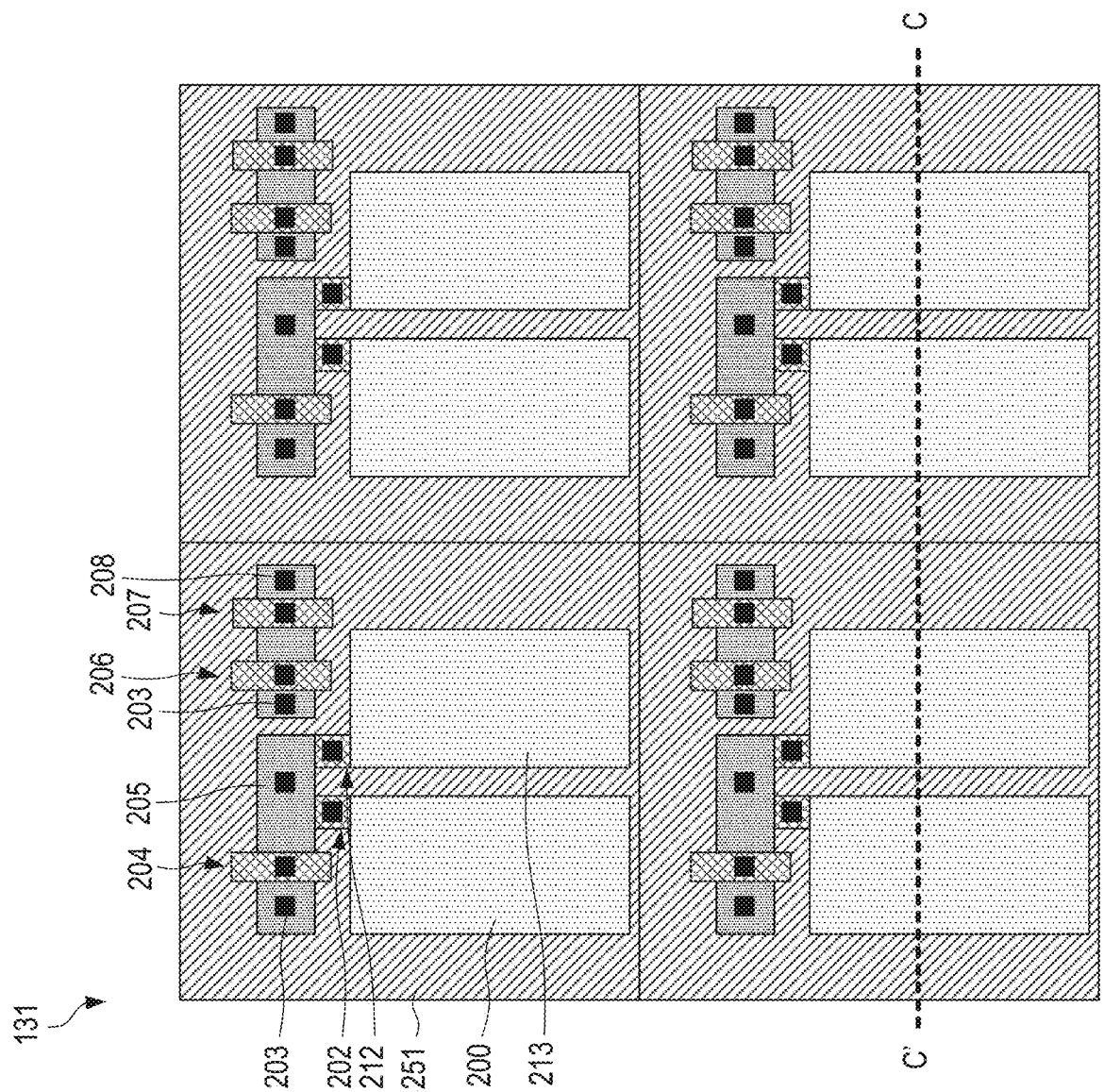
FIG. 18 is a plan view of a first light shielded pixel (NULL pixel) of the imaging apparatus according to the sixth embodiment.

FIG. 16 shows a plan view of the light receiving pixels 120. Four light receiving pixel 120 are shown in FIG. 16. Each light receiving pixel 120 according to the sixth embodiment differs from the light receiving pixel 120 according to the first embodiment in the point that two photoelectric conversion elements 201 and 211 and two transfer transistors 202 and 212 for transferring charges from the photoelectric conversion elements 201 and 211 to a charge-voltage converter 205 are included. The photoelectric conversion elements 201 and 211 can be used, for example, for focus detection. FIG. 17 shows the plan view of second light shielded pixels 132 according to the sixth embodiment. Four second light shielded pixels 132 are shown in FIG. 17. Each second light shielded pixel 132 according to the sixth embodiment differs from the second light shielded pixel 132 according to the first embodiment in the point that two photoelectric conversion elements 201 and 211 and two transfer transistors 202 and 212 for transferring charges from the photoelectric conversion elements 201 and 211 to the charge-voltage converter 205 are included. FIG. 18 shows the plan view of the first light shielded pixels 131 according to the sixth embodiment. Four first light shielded pixels 131 are shown in FIG. 18. Each first light shielded pixel 131 according to the sixth embodiment differs from the first light shielded pixel 131 according to the first embodiment in the point that two transfer transistors 202 and 212 are included.

Figure 19:
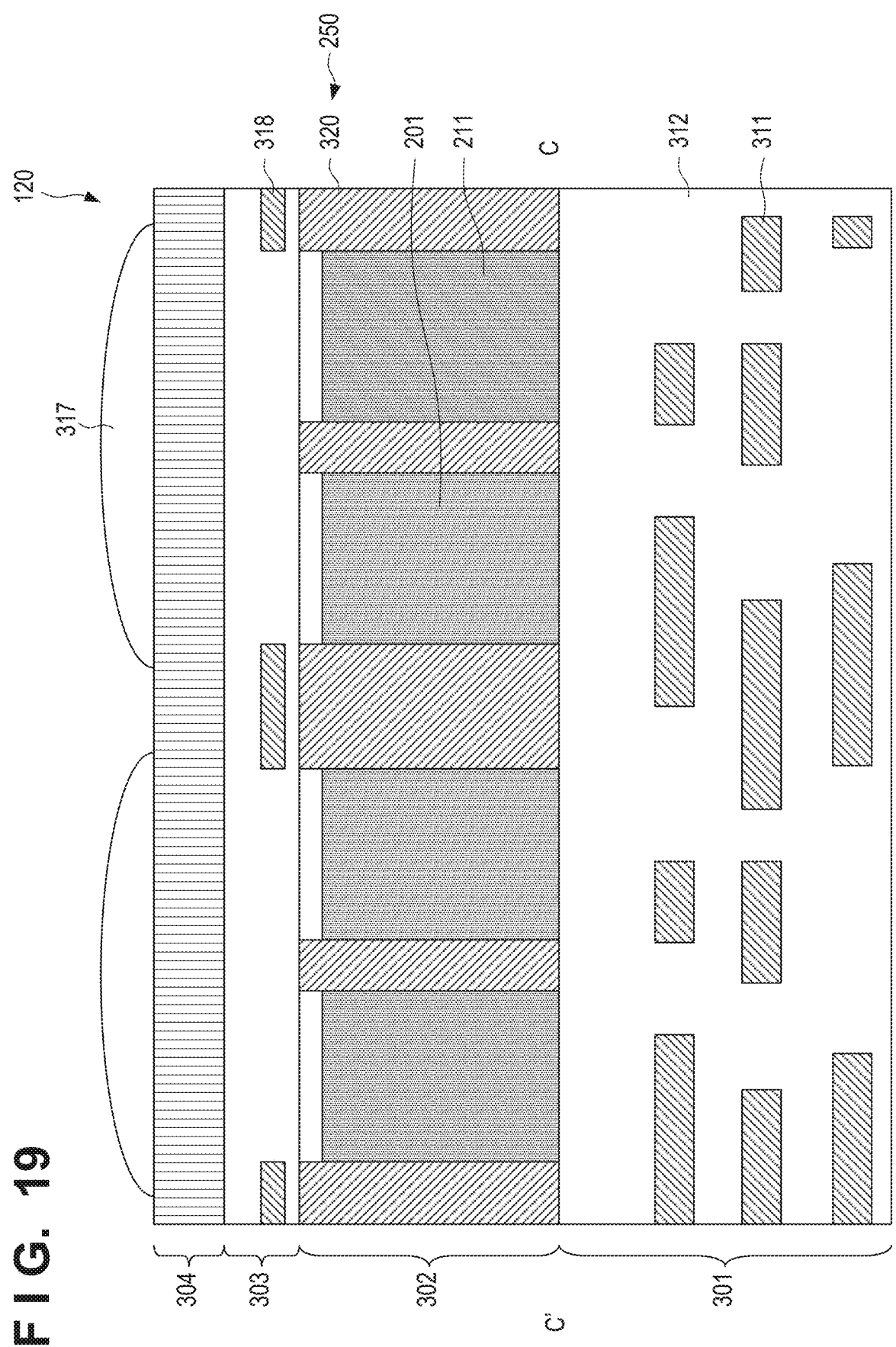
FIG. 19 is a sectional view (taken along a line C-C' in FIG. 16) of the light receiving pixel of the imaging apparatus according to the sixth embodiment.
Figure 20:
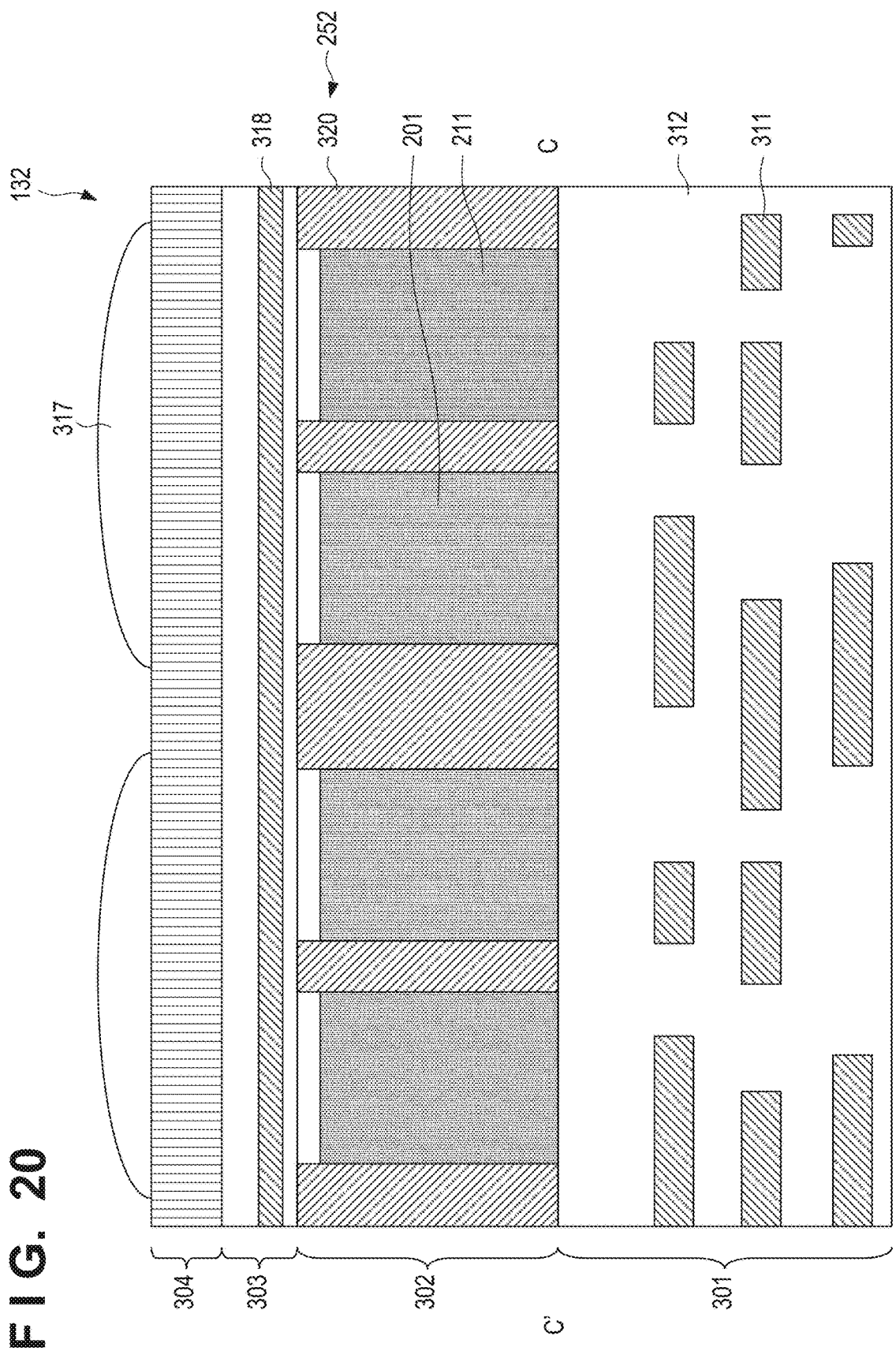
FIG. 20 is a sectional view (taken along a line C-C' in FIG. 17) of the second light shielded pixel (OB pixel) of the imaging apparatus according to the sixth embodiment.
Figure 21:
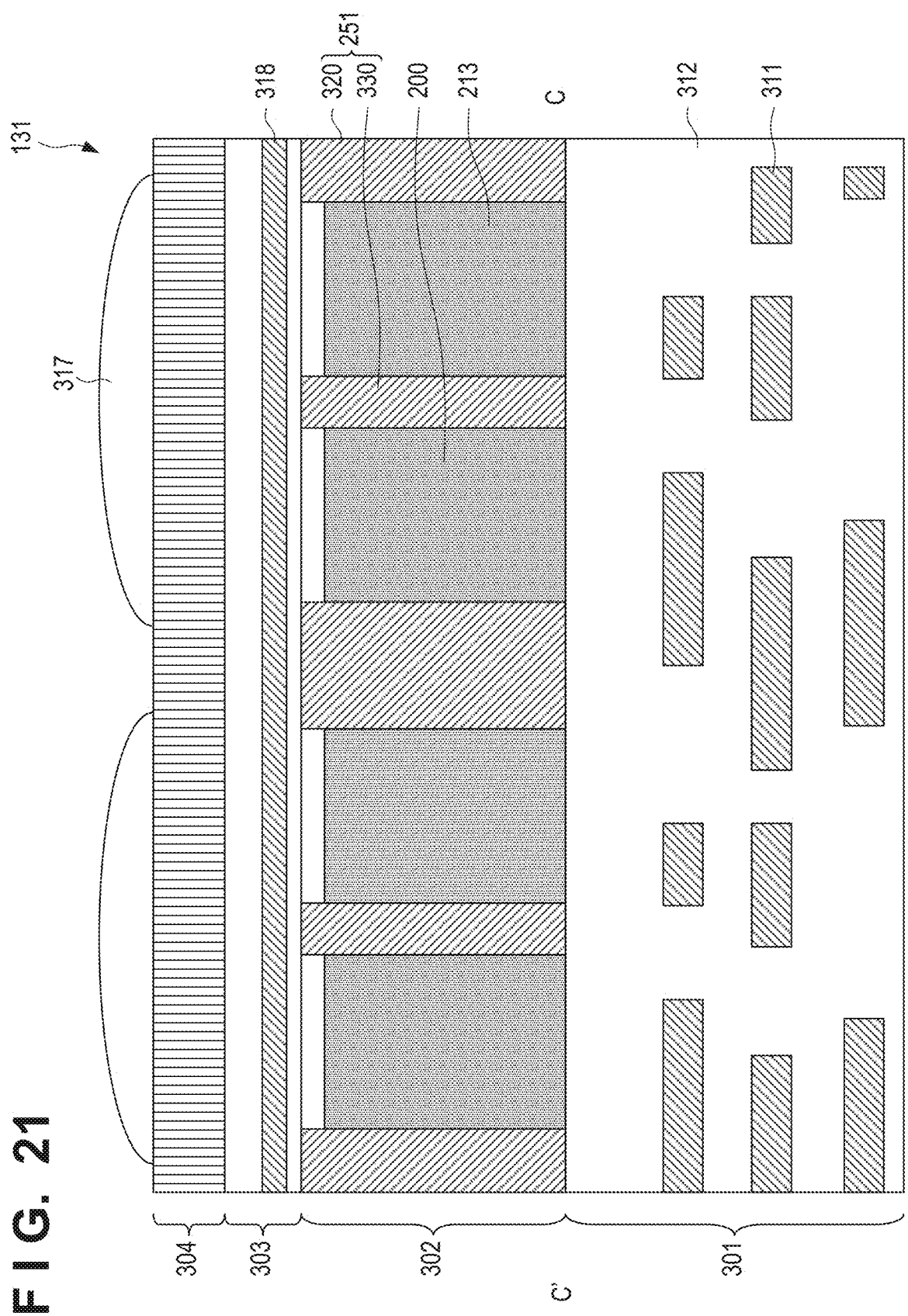
FIG. 21 is a sectional view (taken along a line C-C' in FIG. 18) of the first light shielded pixel (NULL pixel) of the imaging apparatus according to the sixth embodiment.

FIG. 19 shows a sectional view of the light receiving pixel 120 taken along a line C-C' in FIG. 16. An element isolation structure 250 of the light receiving pixel 120 can include a DTI 320. FIG. 20 shows a sectional view of the second light shielded pixel 132 (OB pixel) taken along a line C-C' in FIG. 17. An element isolation structure 252 of the second light shielded pixel 132 can include the DTI 320. Other than the fact that the photoelectric conversion element 201 is covered by a light shielded film, the second light shielded pixel 132 can have the same structure as the light receiving pixel 120. FIG. 21 shows a sectional view of the first light shielded pixel 131 (NULL pixel) taken along a line C-C' in FIG. 18. An element isolation structure 251 of the first light shielded pixel 131 can include the DTI 320 and a DTI 330.

Each of the DTIs 320 and 330 can be formed by filling a vertical trench, which has a high aspect ratio and is formed in a semiconductor substrate 302, with a material (an insulator) that has a refractive index different from the semiconductor substrate 302. Each of the DTIs 320 and 330 can be formed by, for example, depositing an insulator such as silicon oxide or the like by chemical vapor deposition (CVD) or the like. The DTI 320 electrically isolates the light receiving pixel 120 from other pixels (the first light shielded pixels 131, the second light shielded pixels 132, and the other light receiving pixels 120). The DTI 320 electrically isolates the photoelectric conversion elements 201 and 211 from each other. Even in a case in which the photoelectric conversion element of each pixel is divided into a plurality of photoelectric conversion elements, the correction parameter for correcting the signal of the light receiving pixel 120 based on the difference between the signal of the first light shielded pixel 131 and the signal of the second light shielded pixel 132 can be appropriately determined. This will allow a high-quality image to be obtained.

Figure 22:
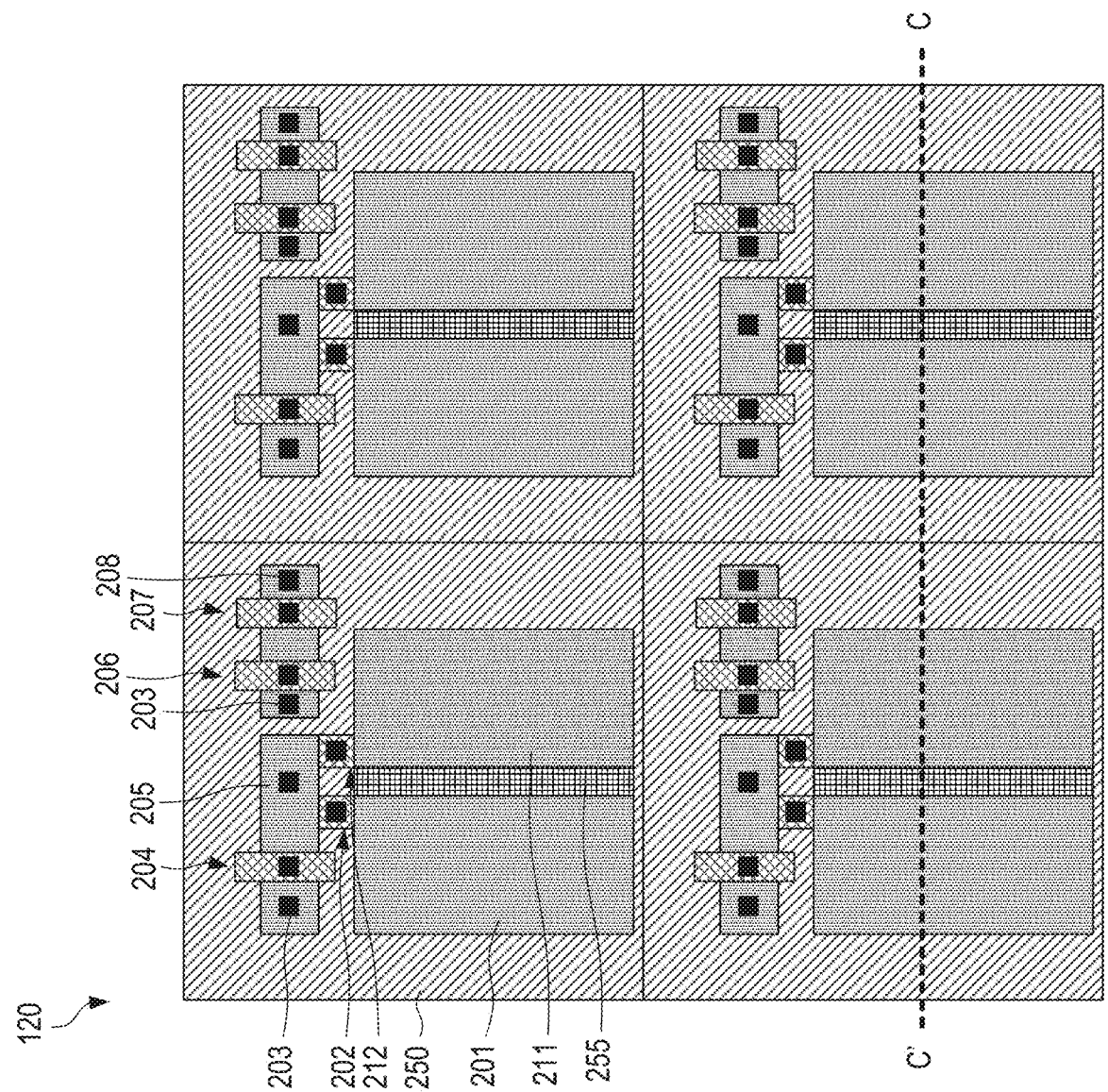
FIG. 22 is a plan view of a light receiving pixel of an imaging apparatus according to the seventh embodiment.
Figure 23:
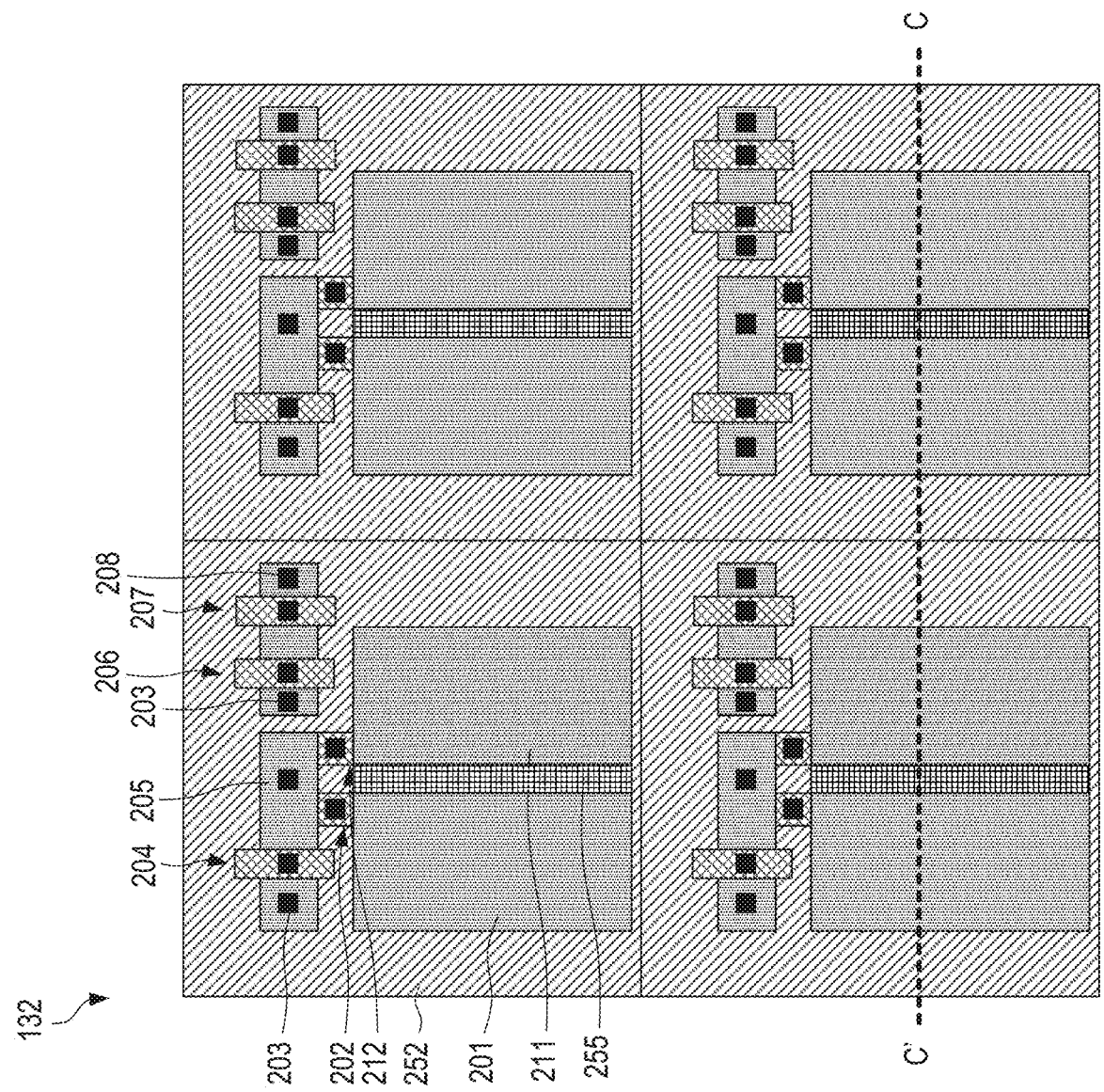
FIG. 23 is a plan view of a second light shielded pixel (OB pixel) of the imaging apparatus according to the seventh embodiment.
Figure 24:
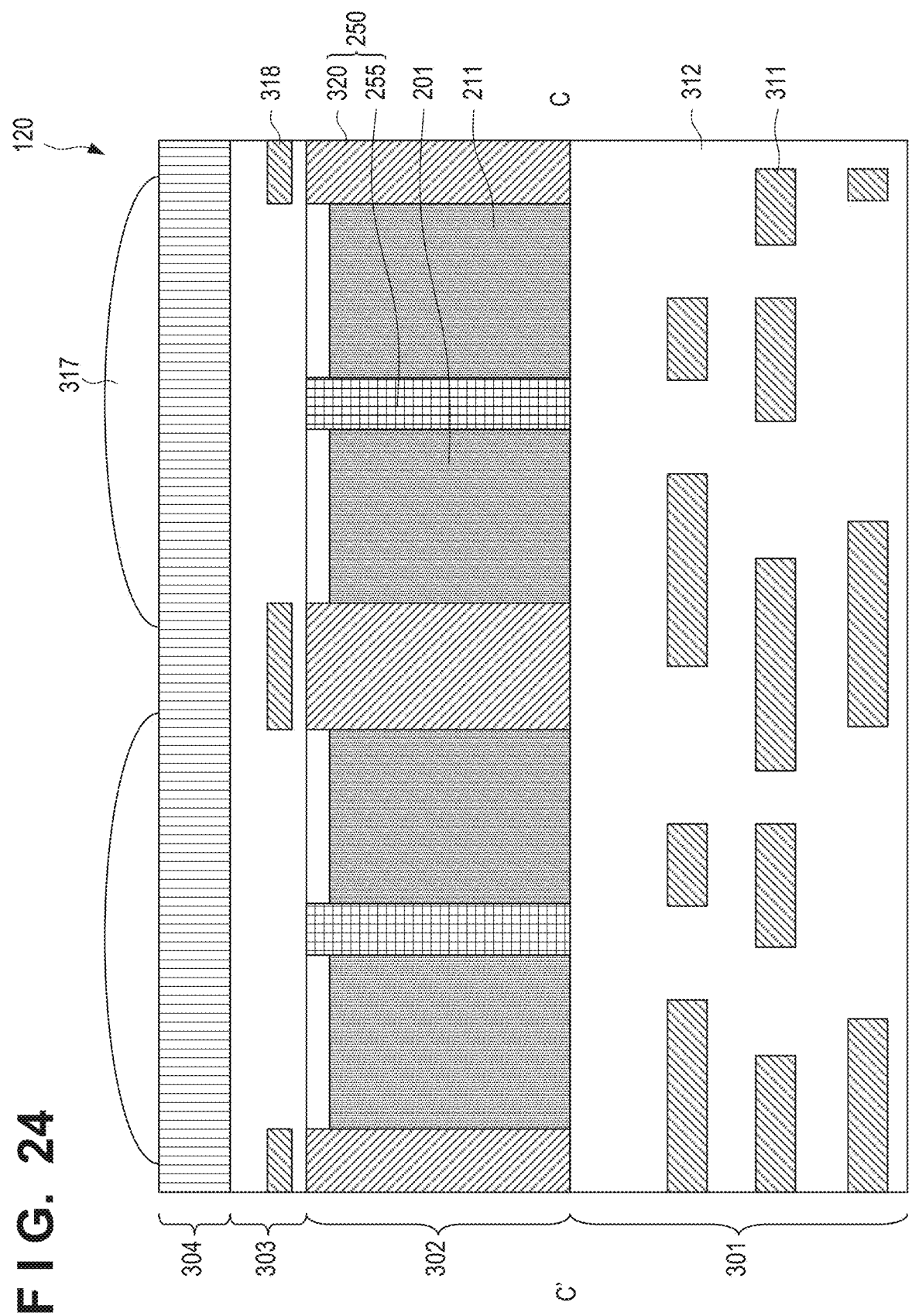
FIG. 24 is a sectional view (taken along a line C-C' in FIG. 22) of the light receiving pixel of the imaging apparatus according to the seventh embodiment.
Figure 25:
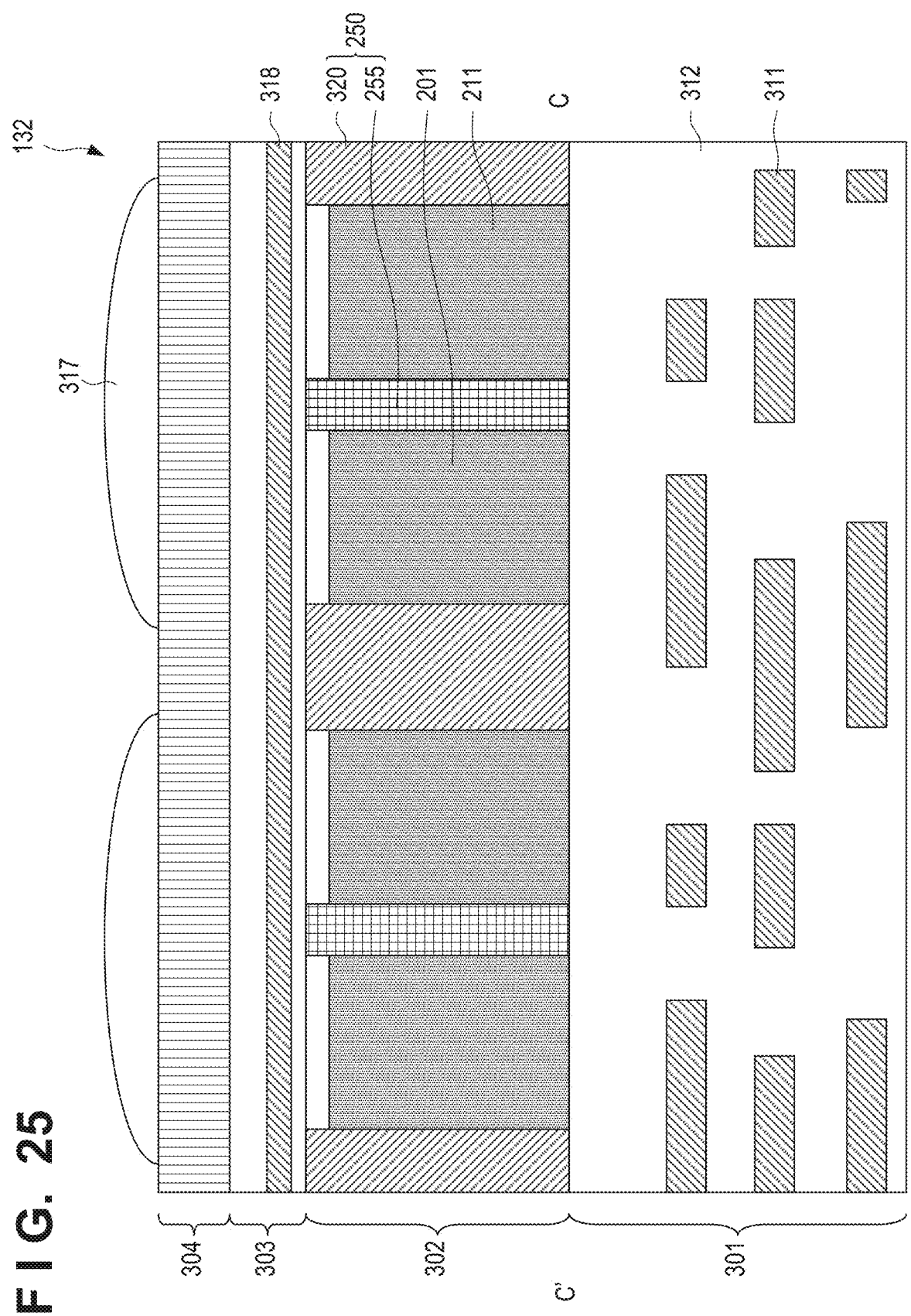
FIG. 25 is a sectional view (taken along a line C-C' in FIG. 23) of the second light shielded pixel (OB pixel) of the imaging apparatus according to the seventh embodiment.

An imaging apparatus IS according to the seventh embodiment will be described with reference to FIGS. 22 to 25. Matters not mentioned in the seventh embodiment can follow those of the sixth embodiment. The seventh embodiment differs from the sixth embodiment in that a photoelectric conversion element 201 and a photoelectric conversion element 211 are electrically isolated by a diffusion isolation region 255. FIG. 22 shows a plan view of light receiving pixels 120 according to the seventh embodiment. Four light receiving pixels 120 are shown in FIG. 22. FIG. 23 shows a plan view of second light shielded pixels 132 according to the seventh embodiment. Four second light shielded pixels 132 are shown in FIG. 23. FIG. 24 shows a sectional view of each light receiving pixel 120 taken along a line C-C' in FIG. 22. FIG. 25 shows a sectional view of each second light shielded pixel 132 taken along a line C-C' in FIG. 23. In each of the light receiving pixel 120 and the second light shielded pixel 132, the photoelectric conversion element 201 and the photoelectric conversion element 211 are electrically isolated by the diffusion isolation region 255. Each first light shielded pixel 131 according to the seventh embodiment can have the same arrangement as that of the first light shielded pixel 131 according to the sixth embodiment.

An imaging apparatus IS according to the eighth embodiment will be described with reference to FIGS. 26 to 31. The imaging apparatus IS according to the eighth embodiment can differ from the imaging apparatus IS according to the first embodiment in the point that a charge holding unit 214 and a second transfer transistor 215 are included. Also, the imaging apparatus IS according to the eighth embodiment can differ from the imaging apparatus IS according to the first embodiment in the point that an element isolation structure 251 of each first light shielded pixel 131 includes an STI 323 and a diffusion isolation region 321.

Figure 26:
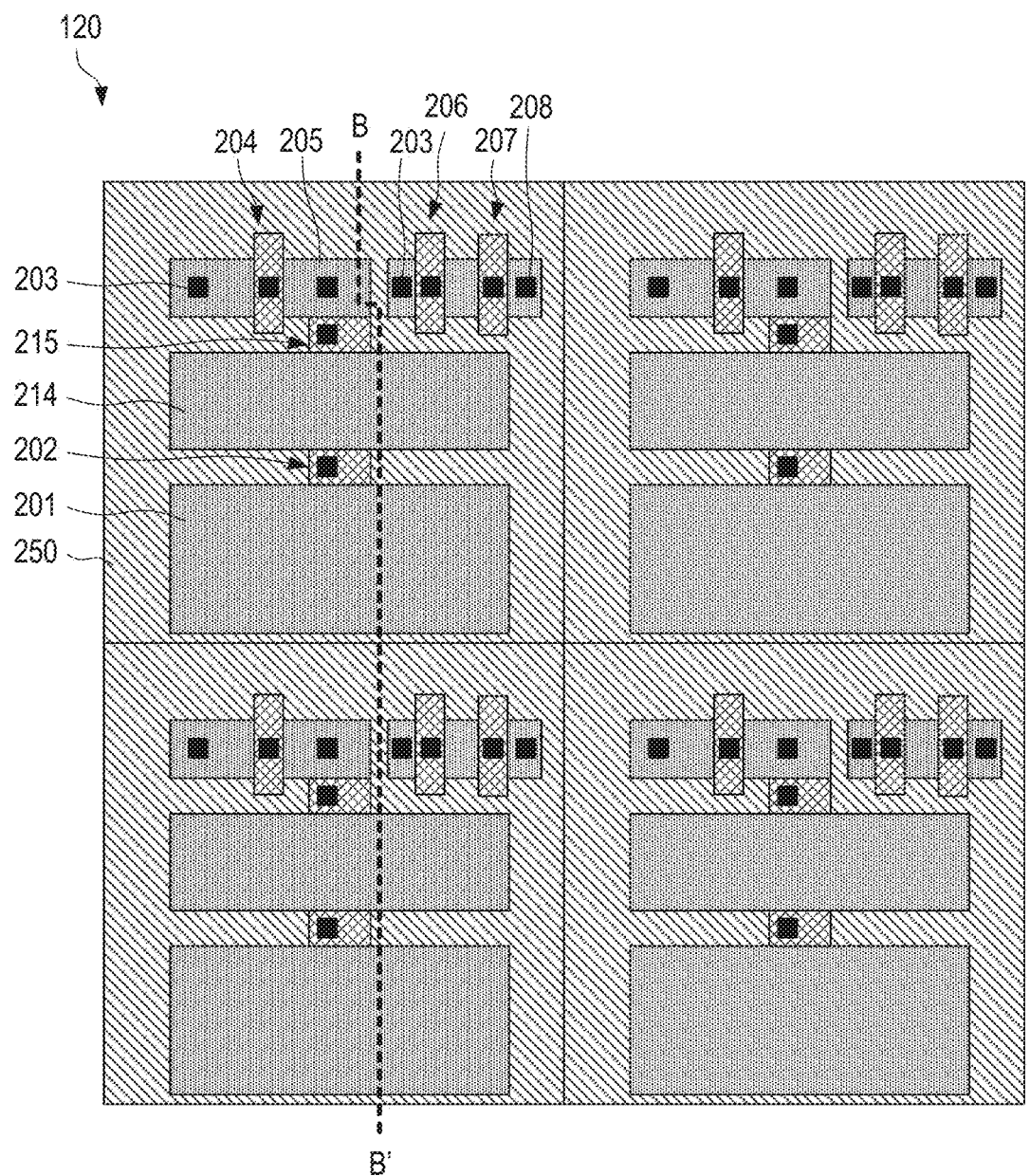
FIG. 26 is a plan view of a light receiving pixel of an imaging apparatus according to the eighth embodiment.

FIG. 26 shows a plan view of light receiving pixels 120. Four light receiving pixels 120 are shown in FIG. 26. Each light receiving pixel 120 can include a photoelectric conversion element 201, a transfer transistor 202, a pixel power supply 203, a reset transistor 204, a charge-voltage converter 205, an amplification transistor 206, a row selection transistor 207, a column signal line 208, and an element isolation structure 250. The photoelectric conversion element (photodiode) 201 includes a charge accumulation region, and the charges generated by photoelectric conversion and accumulated in the charge accumulation region are transferred to the charge holding unit (memory) 214 via the transfer transistor 202. The transfer transistor 202 can function as a global shutter. The charges transferred to the charge holding unit 214 are transferred to the charge-voltage converter (floating diffusion) 205 by the second transfer transistor 215. The charge-voltage converter 205 is electrically connected to the gate of the amplification transistor 206. The source of the amplification transistor 206 is electrically connected to the column signal line 208 via the row selection transistor 207. The element isolation structure 250 electrically isolates the elements such as the photoelectric conversion element 201, the transfer transistor 202, the pixel power supply 203, the reset transistor 204, the charge-voltage converter 205, the amplification transistor 206, the row selection transistor 207, and the like from each other. Also, the element isolation structure 250 of the light receiving pixel 120 electrically isolates the light receiving pixel 120 from other pixels (the first light shielded pixels 131, second light shielded pixels 132, and the other light receiving pixels 120).

Figure 27:
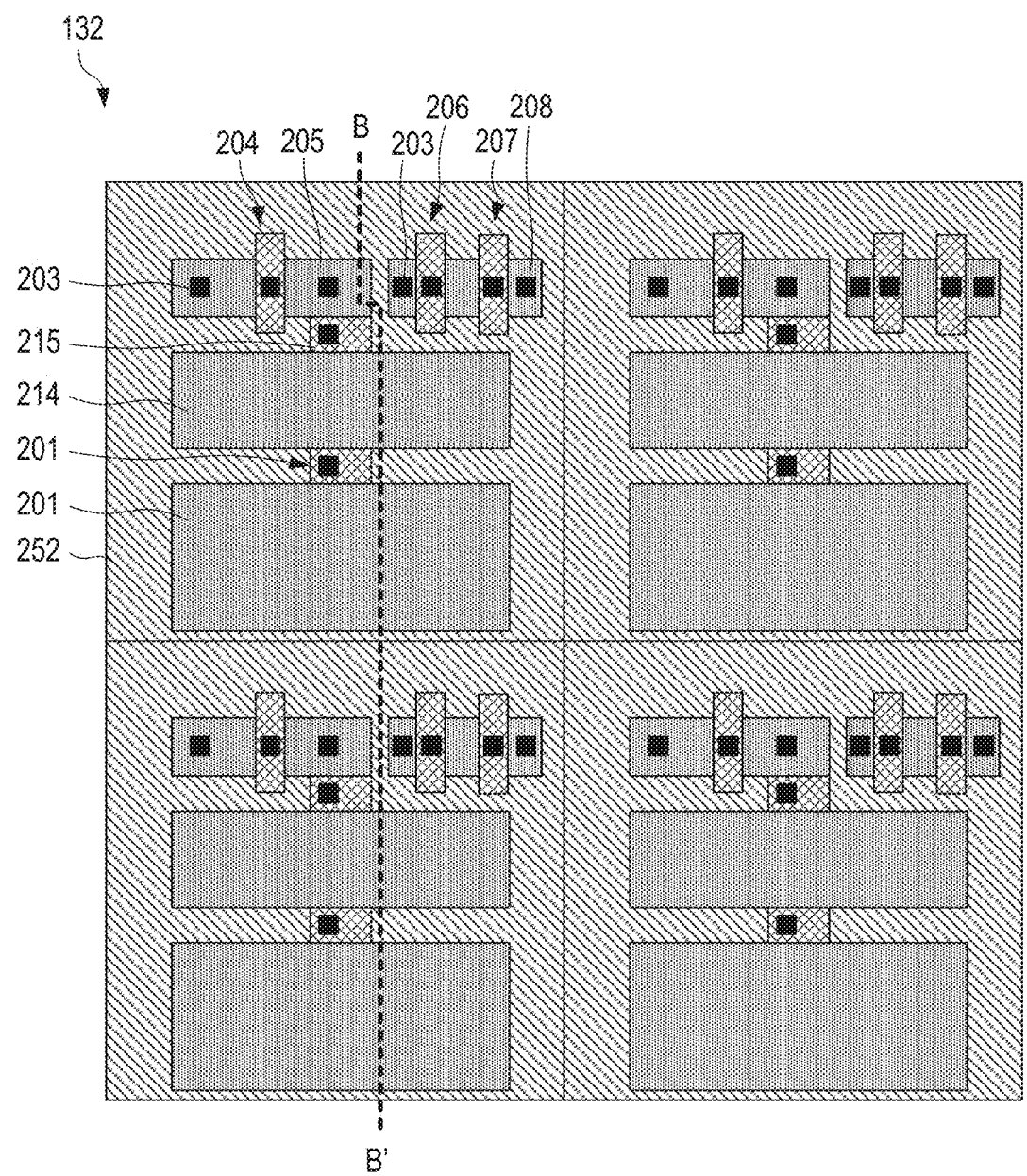
FIG. 27 is a plan view of a second light shielded pixel (OB pixel) of the imaging apparatus according to the eighth embodiment.

FIG. 27 shows a plan view of the second light shielded pixels (OB pixel) 132. Four second light shielded pixels 132 are shown in FIG. 27. Each second light shielded pixel 132 can include the photoelectric conversion element 201, the transfer transistor 202, the pixel power supply 203, the reset transistor 204, the charge-voltage converter 205, the amplification transistor 206, the row selection transistor 207, the column signal line 208, and an element isolation structure 252. The photoelectric conversion element 201 includes a charge accumulation region, and charges generated due to noise such as a dark current or the like and accumulated in the charge accumulation region are transferred to the charge holding unit (memory) 214 via the transfer transistor 202. The transfer transistor 202 can function as a global shutter. The charges transferred to the charge holding unit 214 are transferred to the charge-voltage converter 205 by the second transfer transistor 215. The charge-voltage converter 205 is electrically connected to the gate of the amplification transistor 206. The source of the amplification transistor 206 is electrically connected to the column signal line 208 via the row selection transistor 207. The element isolation structure 252 electrically isolates the elements such as the photoelectric conversion element 201, the transfer transistor 202, the pixel power supply 203, the reset transistor 204, the charge-voltage converter 205, the amplification transistor 206, the row selection transistor 207, and the like from each other. Also, the element isolation structure 252 of the second light shielded pixel 132 electrically isolates the second light shielded pixel 132 from other pixels (the first light shielded pixels 131, the other second light shielded pixels 132, and the light receiving pixels 120). Other than the fact that the photoelectric conversion element 201 is covered by a light shielded film, the second light shielded pixel 132 can have the same structure as the light receiving pixel 120.

Figure 28:
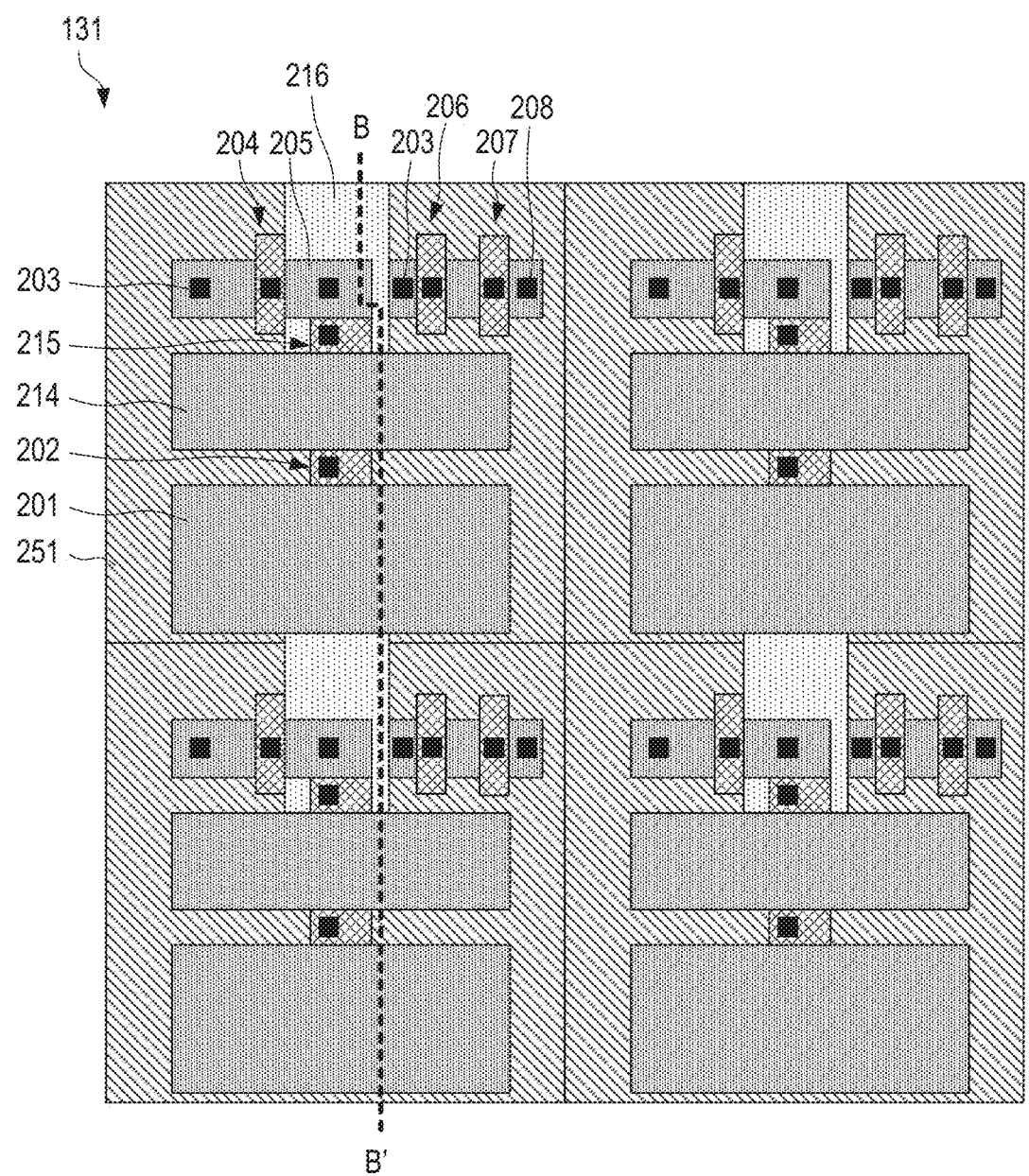
FIG. 28 is a plan view of a first light shielded pixel (NULL pixel) of the imaging apparatus according to the eighth embodiment.

FIG. 28 shows a plan view of the first light shielded pixels (NULL pixels) 131. Four first light shielded pixels are shown in FIG. 28. Each first light shielded pixel 131 can include the photoelectric conversion element 201, the transfer transistor 202, the pixel power supply 203, the reset transistor 204, the charge-voltage converter 205, the amplification transistor 206, the row selection transistor 207, the column signal line 208, and an element isolation structure 251. A source 200 of the transfer transistor 202 can accumulate charges generated due to noise such as a dark current or the like. The charges accumulated in the source 200 are transferred to the charge-voltage converter 205 via the transfer transistor 202. The transfer transistor 202 can function as a global shutter. The charges transferred to the charge holding unit 214 are transferred to the charge-voltage converter 205 by the second transfer transistor 215. The charge-voltage converter 205 is electrically connected to the gate of the amplification transistor 206. The source of the amplification transistor 206 is electrically connected to the column signal line 208 via the row selection transistor 207. The element isolation structure 251 electrically isolates the elements such as the photoelectric conversion element 201, the transfer transistor 202, the pixel power supply 203, the reset transistor 204, the charge-voltage converter 205, the amplification transistor 206, the row selection transistor 207, and the like from each other. Also, the element isolation structure 251 of the first light shielded pixel 131 electrically isolates the first light shielded pixel 131 from other pixels (the other first light shielded pixels 131, the second light shielded pixels 132, and the light receiving pixels 120).

Figure 29:
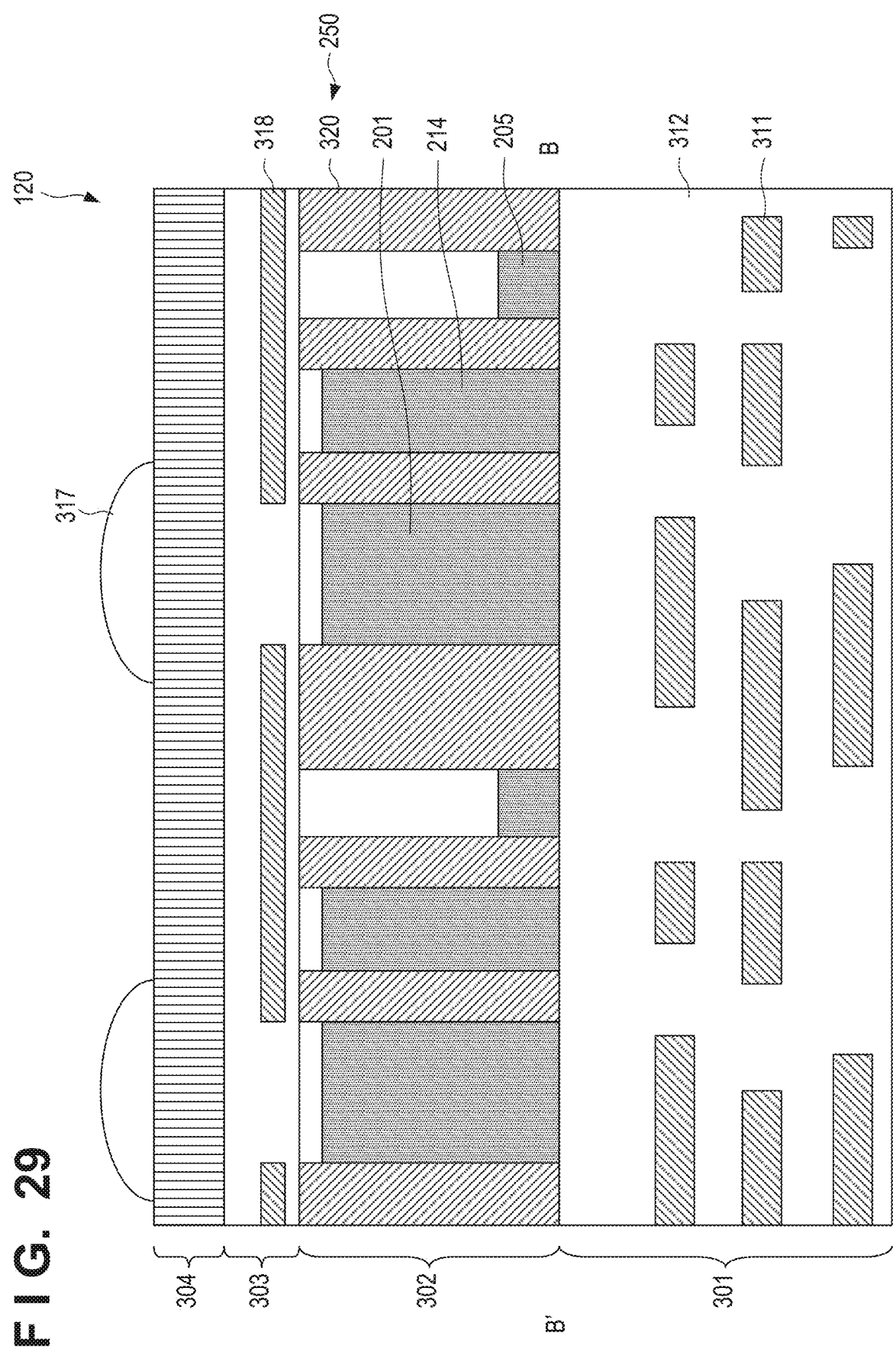
FIG. 29 is a sectional view (taken along a line B-B' in FIG. 26) of the light receiving pixel of the imaging apparatus according to the eighth embodiment.
Figure 30:
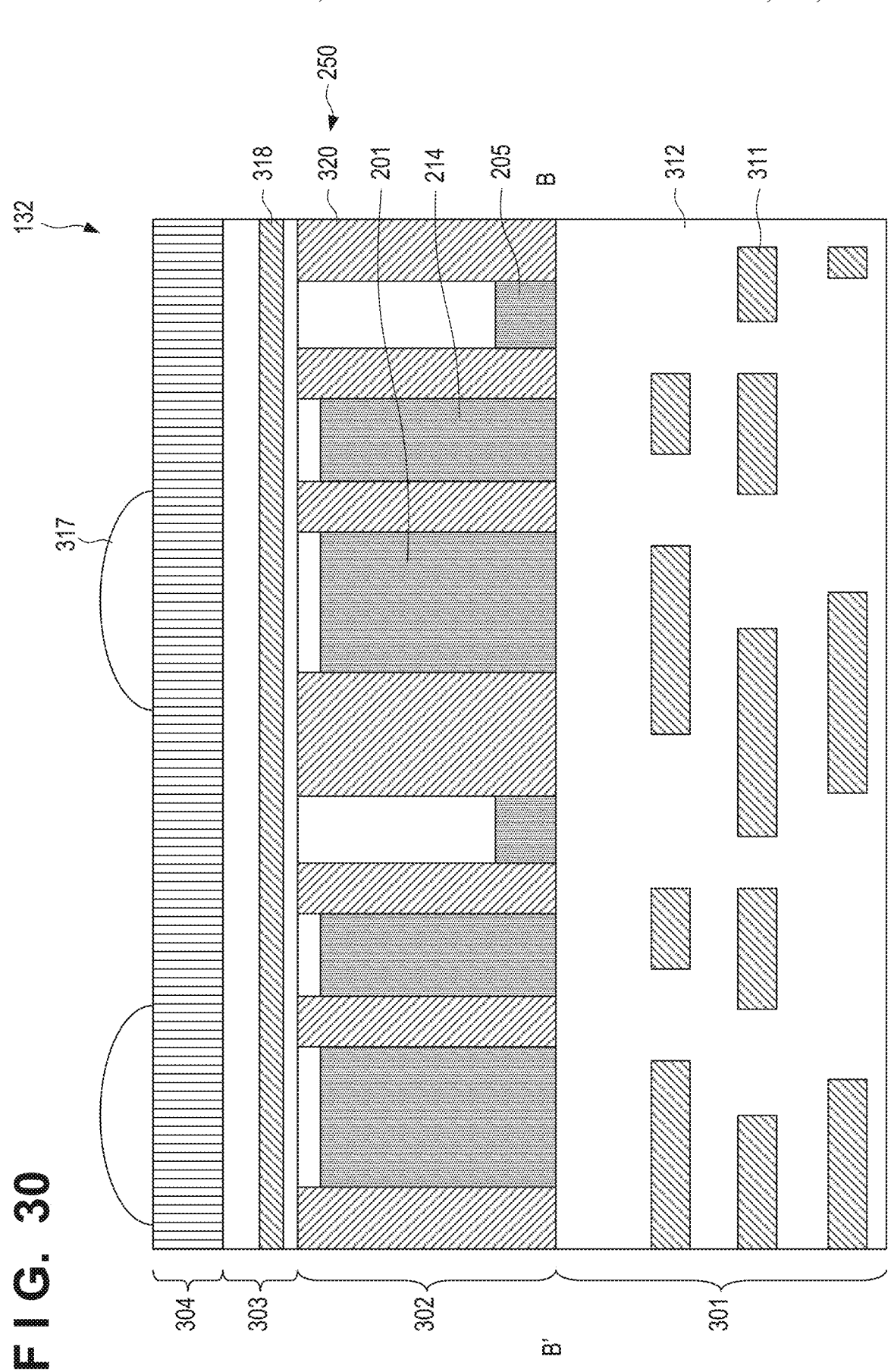
FIG. 30 is a sectional view (taken along a line B-B' in FIG. 27) of the second light shielded pixel (OB pixel) of the imaging apparatus according to the eighth embodiment.

FIG. 29 shows a sectional view of each light receiving pixel 120 taken along a line B-B' in FIG. 26. FIG. 30 shows a sectional view of each second light shielded pixel 132 taken along a line B-B' in FIG. 27. Each of the element isolation structure 250 of the light receiving pixel 120 and the element isolation structure 252 of the second light shielded pixel 132 is formed by a DTI 320. The DTI 320 of the light receiving pixel 120 electrically isolates the light receiving pixel 120 from the other pixels (the first light shielded pixels 131, the second light shielded pixels 132, and the other light receiving pixels 120). Also, the DTI 320 of the second light shielded pixel 132 electrically isolates the second light shielded pixel 132 from the other pixels (the first light shielded pixels 131, the other second light shielded pixels 132, and the light receiving pixels 120). The DTI of the light receiving pixel 120 electrically isolates the plurality of elements in the light receiving pixel 120 from each other, and the DTI of the second light shielded pixel 132 electrically isolates the plurality of elements in the second light shielded pixel 132 from each other. The plurality of elements can be the photoelectric conversion element 201, the transfer transistors 202 and 215, the charge holding unit 214, the reset transistor 204, the charge-voltage converter 205, the amplification transistor 206, the row selection transistor 207, and the like.

Figure 31:
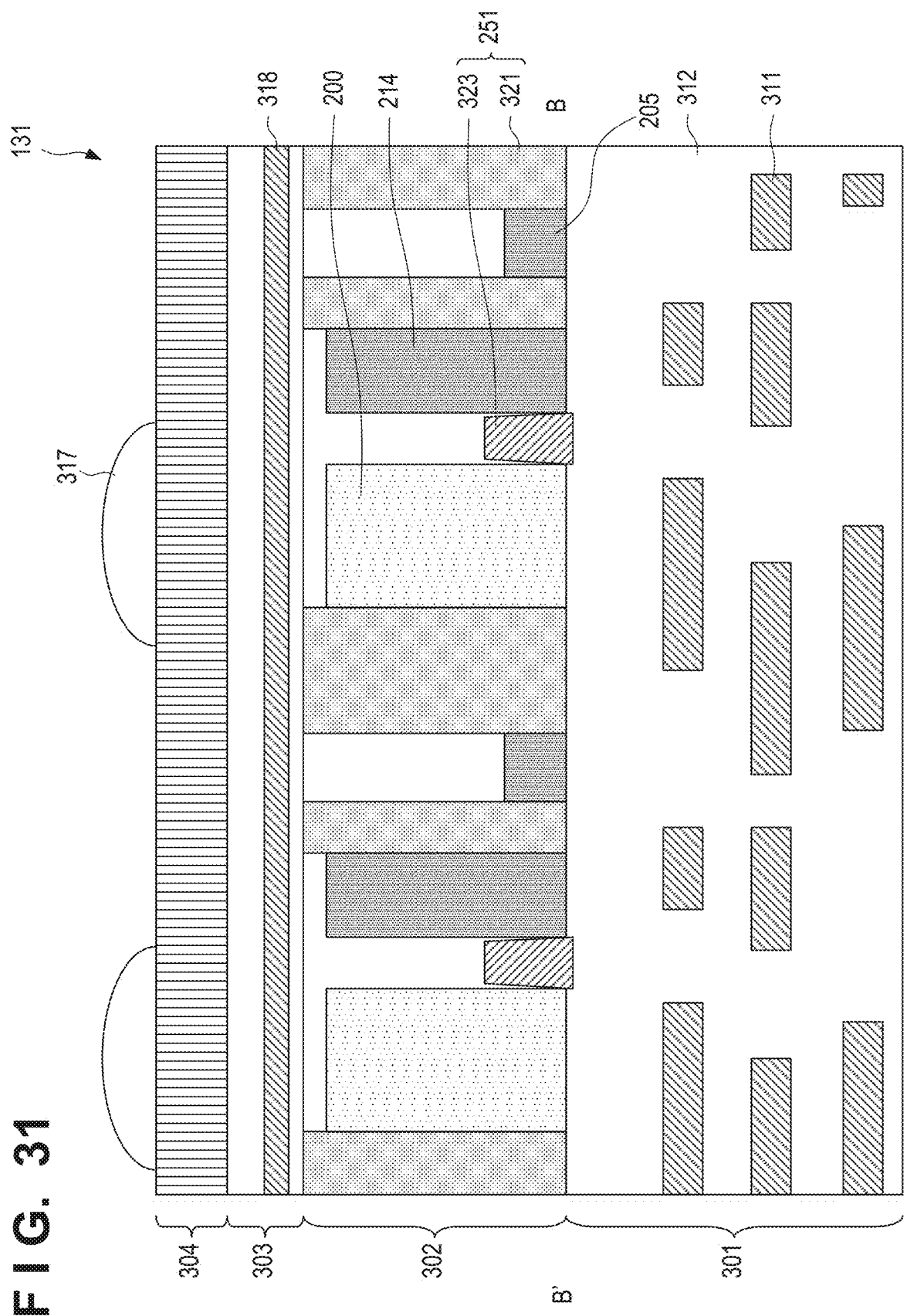
FIG. 31 is a sectional view (taken along a line B-B' in FIG. 28) of the first light shielded pixel (NULL pixel) of the imaging apparatus according to the eighth embodiment.

FIG. 31 shows a sectional view of each first light shielded pixel 131 (NULL pixel) taken along a line B-B' in FIG. 28. The element isolation structure 251 of the first light shielded pixel 131 includes the diffusion isolation region 321 and the STI 323. The source 200 of the transfer transistor 202 and the charge holding unit 214 can be isolated by the STI 323. The charge-voltage converter 205 can be isolated from elements surrounding the charge-voltage converter 205 by the diffusion isolation region 321. The charge-voltage converter 205 does not contact the STI and the DTI. This kind of arrangement can suppress a noise component due to the dark current from mixing into each signal accumulated in the charge-voltage converter 205.

Figure 32:
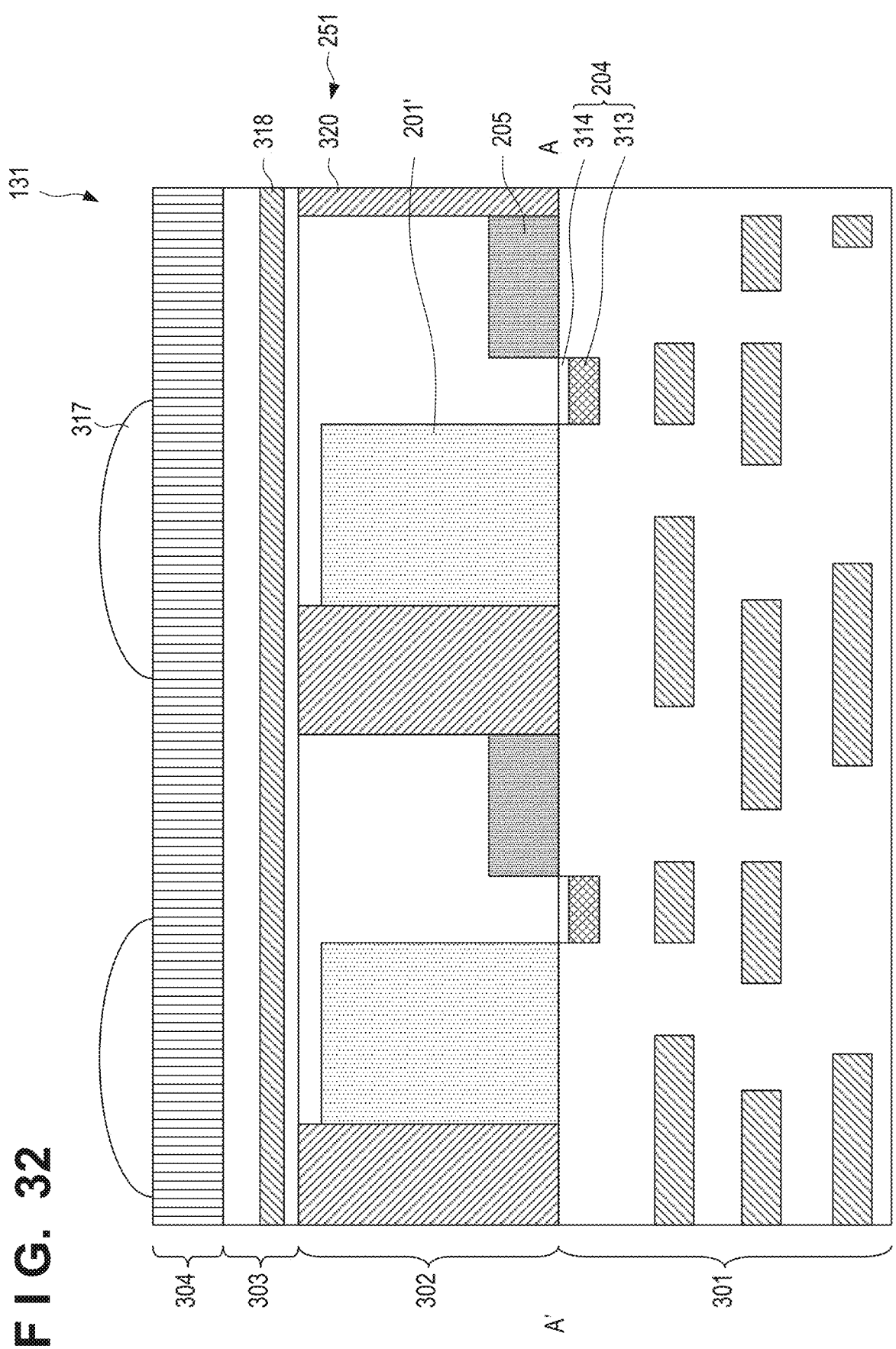
FIG. 32 is a sectional view (taken along a line A-A' in FIG. 5) of a first light shielded pixel (NULL pixel) of an imaging apparatus according to the ninth embodiment.

An imaging apparatus IS according to the ninth embodiment will be described with reference FIG. 32. FIG. 32 shows a sectional view of a first light shielded pixel 131 taken along a line A-A' in FIG. 5. The ninth embodiment differs from the eighth to eighth embodiments in the point that each first light shielded pixel 131 includes a photoelectric conversion element 201' including a charge accumulation region instead of a source 200. The first light shielded pixel 131 according to the ninth embodiment can be embodied by, for example, combining each light receiving pixel 120 (FIG. 13) and each second light shielded pixel 132 (FIG. 14) according to the fifth embodiment. The first light shielded pixel 131 may be formed to output a signal larger than the signal output from the second light shielded pixel 132 or formed to output a signal smaller than the signal output from the second light shielded pixel 132.

Figure 33:
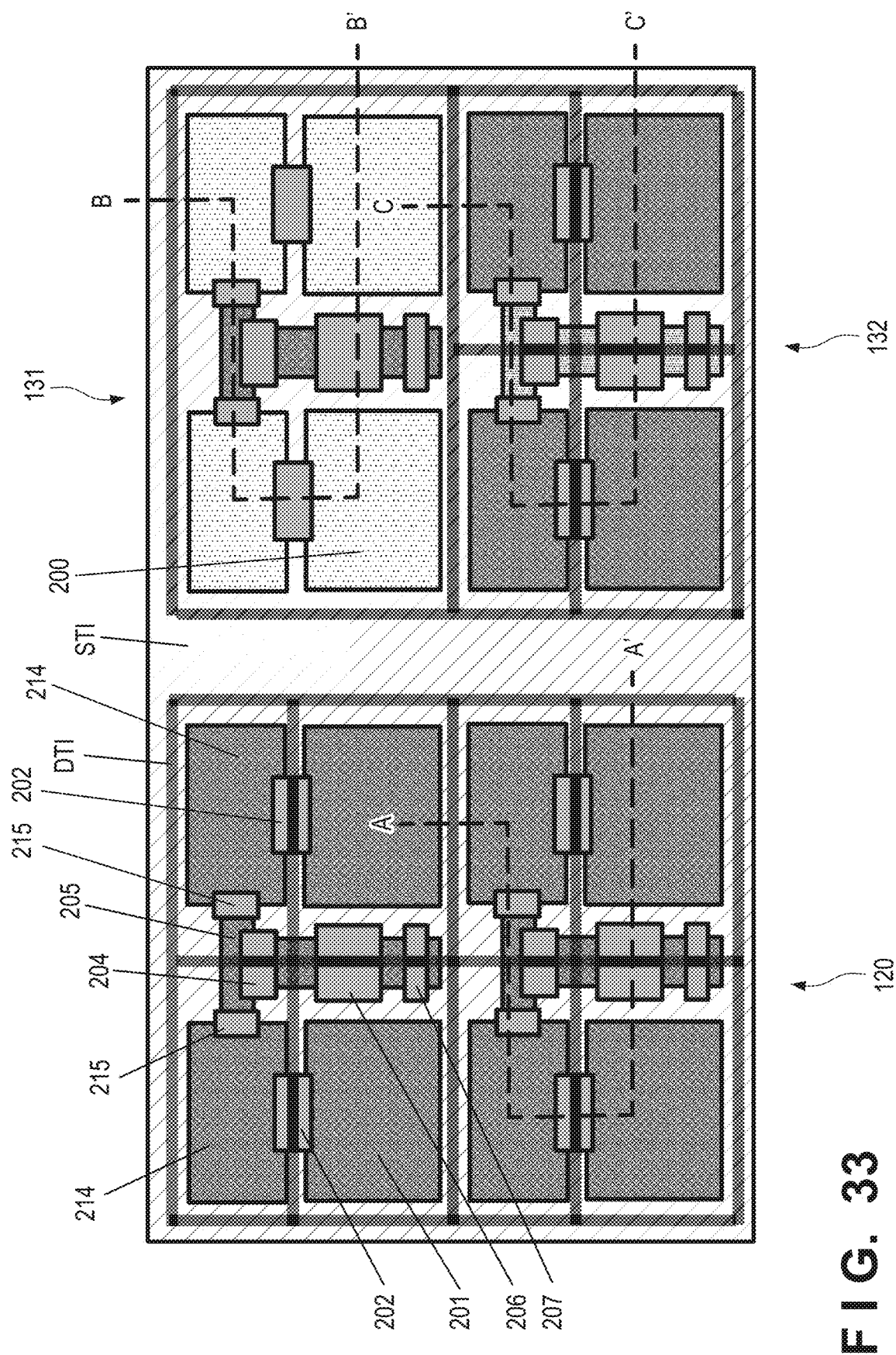
FIG. 33 is a plan view of a light receiving pixel, a first light shielded pixel, and a second light shielded pixel of an imaging apparatus according to the 10th embodiment.
Figure 34:
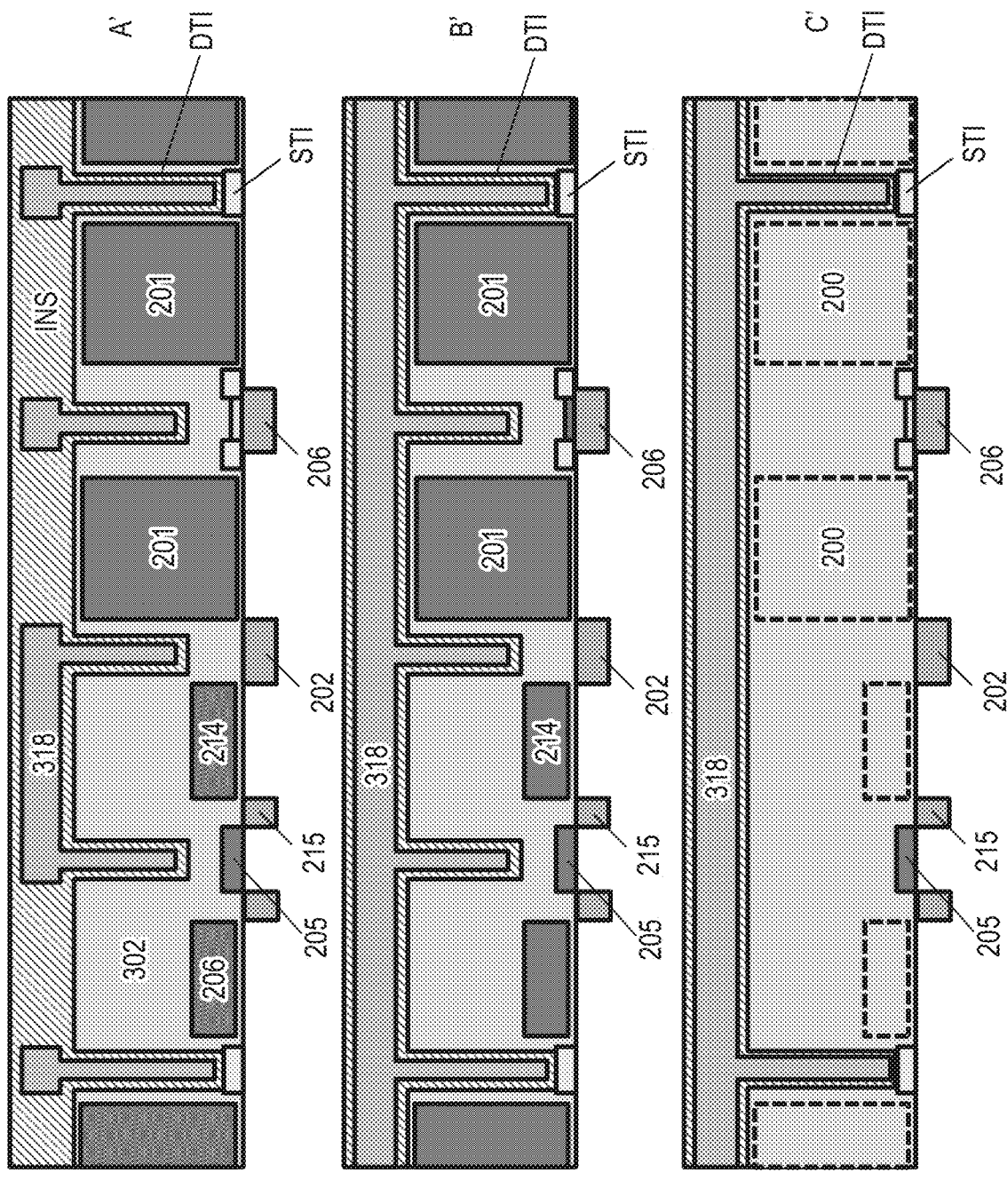
FIGS. 34A, 34B, and 34C are sectional views (taken along a line A-A', a line B-B', and a line C-C', respectively, in FIG. 33) of the light receiving pixel, the first light shielded pixel, and the second light shielded pixel, respectively, of the imaging apparatus according to the 10th embodiment.

An imaging apparatus IS according to the 10th embodiment will be described hereinafter with reference to FIG. 33 and FIGS. 34A to 34C. Matters not mentioned as the 10th embodiment can follow those of the first embodiment. FIG. 33 is a schematic plan view showing the arrangement of the imaging apparatus IS according to the 10th embodiment. FIG. 33 shows two light receiving pixels 120, one first light shielded pixel 131, and one second light shielded pixel 132 for the sake of descriptive convenience.

Other than the fact that a photoelectric conversion element 201 is covered by a light shielded film, the second light shielded pixel 132 can have the same structure as the light receiving pixel 120. The first light shielded pixel 131 can be defined as a pixel that is a light shielded pixel and is a pixel which does not include a charge accumulation region or a pixel which does not include a photoelectric conversion element. The first light shielded pixel 131 and the second light shielded pixel 132 can be relatively defined based on the differences between their respective characteristics. For example, the impurity concentration of a source 200 of a transfer transistor 202 of the first light shielded pixel 131 can be lower than the impurity concentration of the source (the photoelectric conversion element 201) of the transfer transistor 202 of the second light shielded pixel 132 (OB pixel).

Each light receiving pixel 120 and each second light shielded pixel 132 can have element isolation structures that have the same structure. Each element isolation structure can be formed by a DTI and an STI. A light shielded film 318 can have a portion embedded in the DTI. The element isolation structure of the first light shielded pixel 131 shown in FIG. 34C can be different from the element isolation structures of the light receiving pixel 120 and the second light shielded pixel 132 shown in FIGS. 34A and 34B, respectively.

The element isolation structure of each first light shielded pixel 131 includes the DTI between the first light shielded pixel 131 and another pixel (the light receiving pixel, another first light shielded pixel, or the second light shielded pixel), but does not include the DTI between the plurality of elements in the first light shielded pixel 131. On the other hand, the element isolation structure of each light receiving pixel 120 includes the DTI between the light receiving pixel 120 and another pixel (another light receiving pixel, the first light shielded pixel, or the second light shielded pixel), and also includes the DTI between the plurality of elements in the light receiving pixel 120. In a similar manner, the element isolation structure of each second light shielded pixel includes the DTI between the second light shielded pixel 132 and another pixel (the light receiving pixel, the first light shielded pixel, or another second light shielded pixel), and includes the DTI between the plurality of elements in the second light shielded pixel 132. The DTI included in the first light shielded pixel 131 and the DTI included in the second light shielded pixel 132 have different shapes from each other.

In another point of view, the element isolation structure of each first light shielded pixel 131 includes the STI between the first light shielded pixel 131 and another pixel (the light receiving pixel, another first light shielded pixel, or the second light shielded pixel), and includes the STI between the plurality of elements in the first light shielded pixel 131. In a similar manner, the element isolation structure of each light receiving pixel 120 includes the STI between the light receiving pixel 120 and another pixel (another light receiving pixel, the first light shielded pixel, or the second light shielded pixel), and includes the STI between the plurality of elements in the light receiving pixel 120. In a similar manner, the element isolation structure of each second light shielded pixel 132 includes the STI between the second light shielded pixel 132 and another pixel (the light receiving pixel, the first light shielded pixel, or another second light shielded pixel), and includes the STI between the plurality of elements in the second light shielded pixel 132. Although the first light shielded pixel 131 and the second light shielded pixel 132 can have STIs which are the same, they may include STIs which are different from each other.

Figure 35:
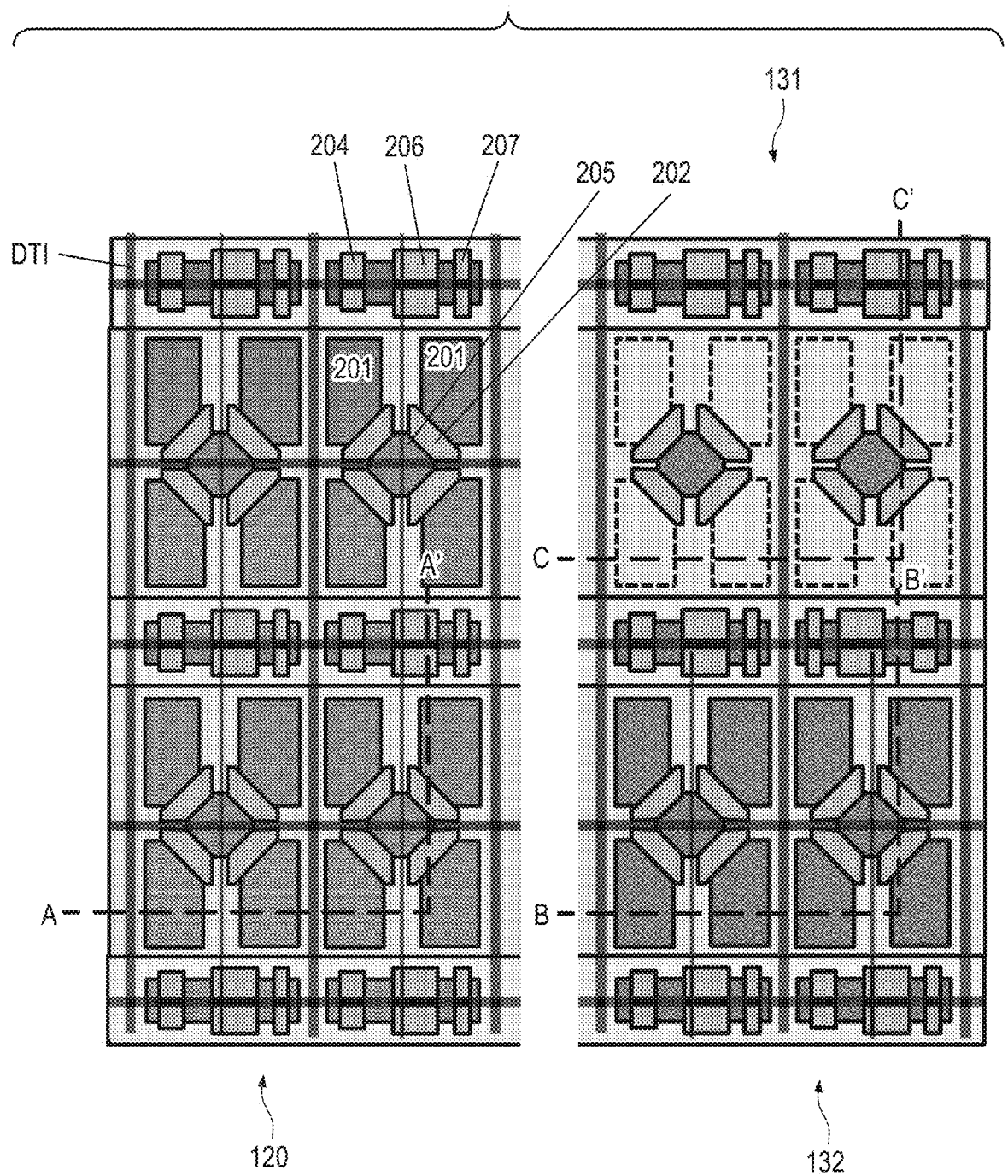
FIG. 35 is a plan view of a light receiving pixel, a first light shielded pixel, and a second light shielded pixel of an imaging apparatus according to the 11th embodiment.
Figure 36A:
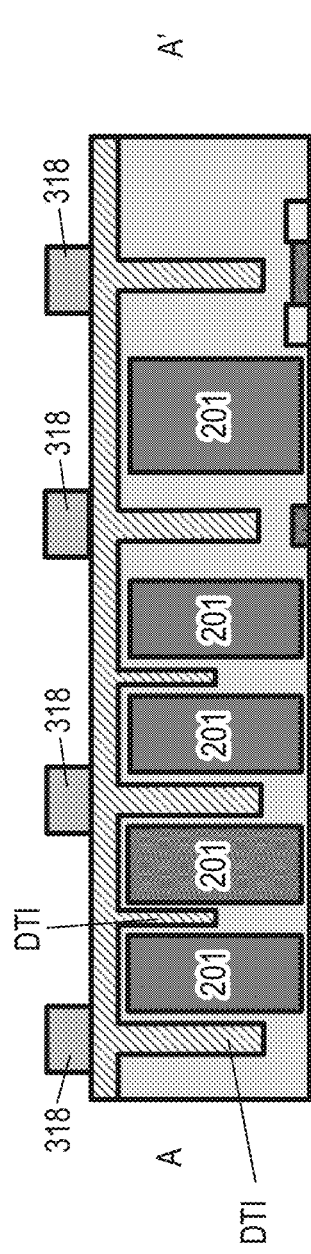
FIGS. 36A, 36B, and 36C are sectional views (taken along a line A-A', a line B-B', and a line C-C', respectively, in FIG. 35) of the light receiving pixel, the first light shielded pixel, and the second light shielded pixel, respectively, of the imaging apparatus according to the 11th embodiment.
Figure 36B:
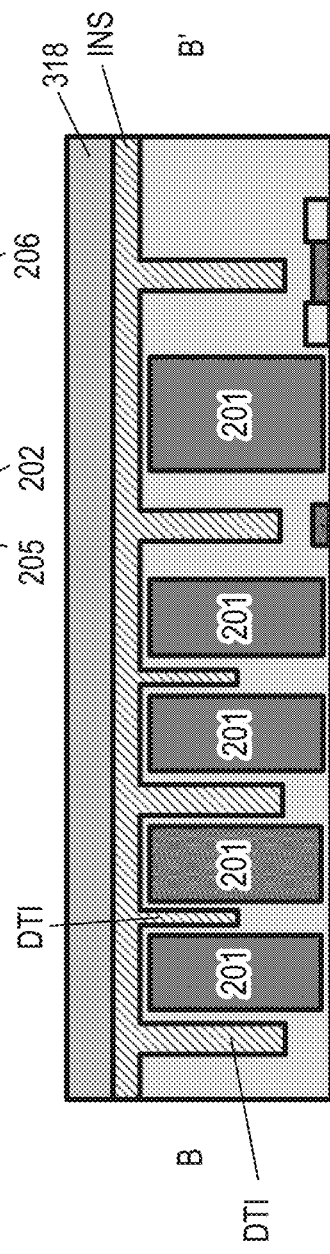
Figure 36C:
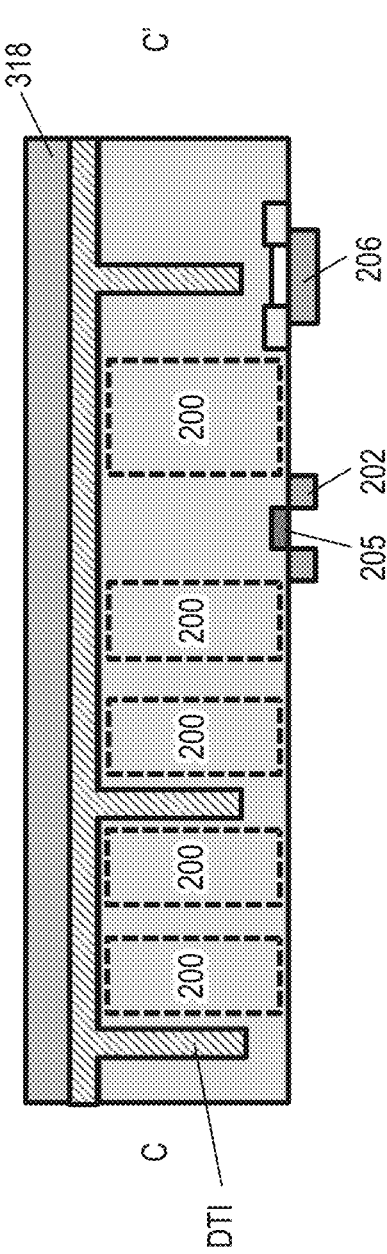

An imaging apparatus IS according to the 11th embodiment will be described hereinafter with reference to FIGS. 35 and 36. Matters not mentioned in the 11th embodiment can follow those of the first embodiment. FIG. 35 is a schematic plan view showing the arrangement of the imaging apparatus IS according to the 11th embodiment. FIG. 35 shows four light receiving pixels 120, two first light shielded pixels 131, and two second light shielded pixels 132 for the sake of descriptive convenience.

Other than the fact that a photoelectric conversion element 201 is covered by a light shielded film, each second light shielded pixel 132 can have the same structure as the light receiving pixel 120. The first light shielded pixel 131 can be defined as a pixel that is shielded from light and is a pixel which does not include a charge accumulation region or a pixel which does not include a photoelectric conversion element. The first light shielded pixel 131 and the second light shielded pixel 132 can be relatively defined based on the differences between their respective characteristics. For example, the impurity concentration of a source 200 of a transfer transistor 202 of the first light shielded pixel 131 can be lower than the impurity concentration of the source (the photoelectric conversion element 201) of the transfer transistor 202 of the second light shielded pixel 132 (OB pixel).

The element isolation structure of each light receiving pixel 120 and the element isolation structure of each second light shielded pixel 132 can have the same structure. Each of the element isolation structure of the light receiving pixel 120 and the element structure of the second light shielded pixel 132 can be formed by a DTI. Each of the light receiving pixel 120 and the second light shielded pixel 132 can have a structure in which the DTI that isolates the elements inside a pixel from each other has a structure that is shallower than the DTI between the pixels (the light receiving pixels, the first light shielded pixels, or the second light shielded pixels). The element isolation structure of each first light shielded pixel 131 can be different from the element isolation structures of each light receiving pixel 120 and each second light shielded pixel 132. The element isolation structure of the first light shielded pixel 131 includes the DTI between the first light shielded pixel 131 and another pixel (the light receiving pixel, another first light shielded pixel, or the second light shielded pixel), but does not include the DTI between the elements forming the first light shielded pixel 131.

The imaging apparatus IS described above can be formed as, for example, an imaging apparatus chip or a camera. In this case, the concept of a camera includes, not only an apparatus whose main purpose is imaging, but also an apparatus (for example, a personal computer or a mobile terminal such as a tablet) that auxiliary includes an imaging function. The imaging apparatus IS described above may be embedded in an equipment. Such an equipment may be, for example, a smartphone, an electronic equipment such as a general-purpose computer or the like, a transportation equipment such as an automobile, an office equipment such as a copy machine, a scanner, or the like, a medical equipment for making a diagnosis by radiation or for endoscopic observation, an industrial equipment such as an industrial robot or the like, an analysis equipment such as an electronic microscope or the like. In one example, the equipment can include at least one of the imaging apparatus IS, an optical apparatus that forms an optical image on an imaging surface of the imaging apparatus IS, and a display equipment for displaying information obtained by the imaging apparatus IS.

Figure 37:
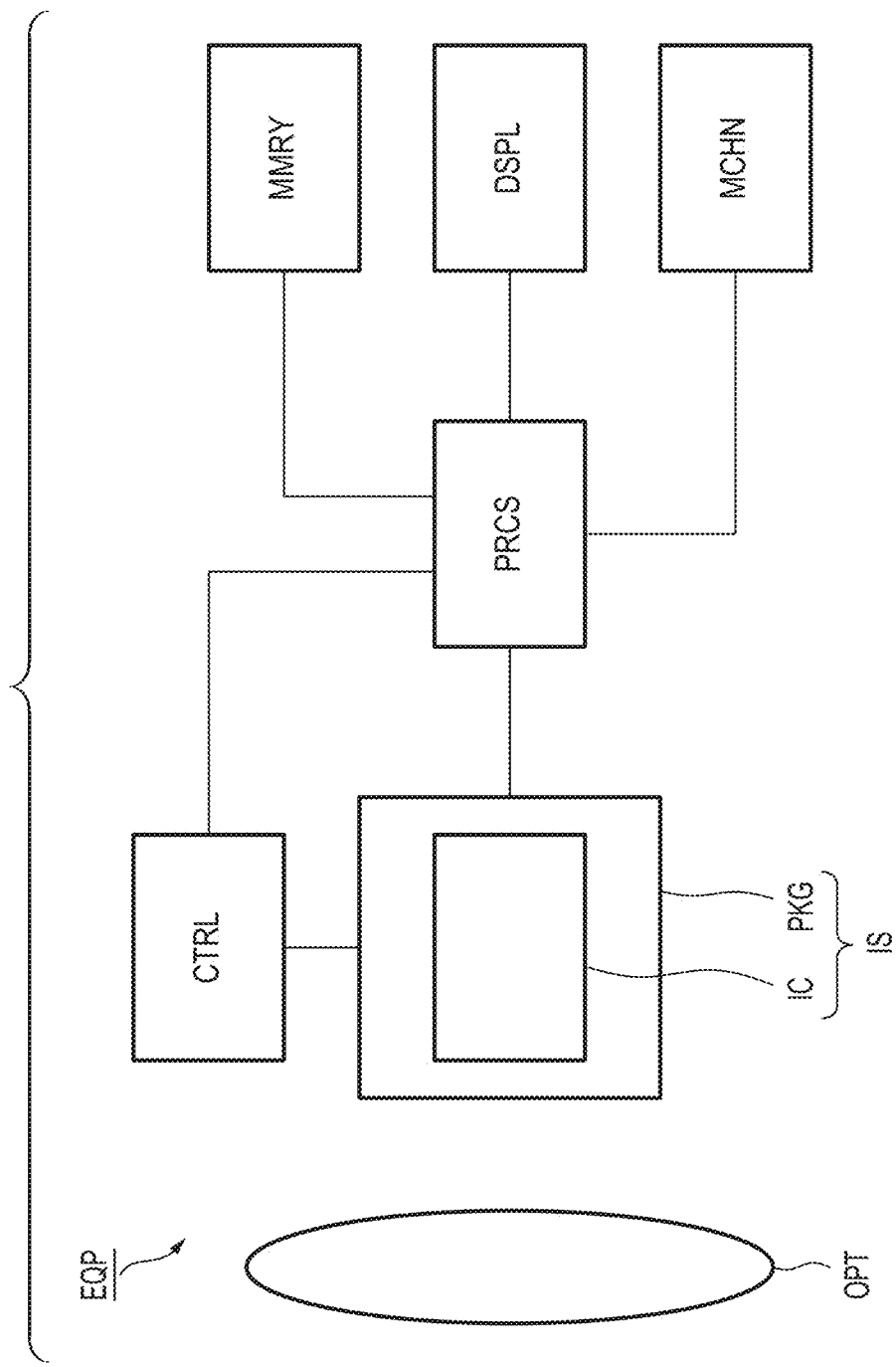
FIG. 37 is a schematic view showing the arrangement of an equipment according to an embodiment.

FIG. 37 is a schematic view showing the arrangement of an equipment EQP incorporating the imaging apparatus IS formed as an imaging apparatus. An example of the equipment EQP is an electronic equipment (information equipment) such as a camera, a smartphone, or the like or a transportation equipment such as an automobile, a ship, an airplane, or the like. The imaging apparatus IS can include, other than a semiconductor device IC including a semiconductor substrate (semiconductor chip), a package PKG for storing the semiconductor device IC. The package PKG can include a base on which the semiconductor device IC is fixed and a lid member made of glass or the like which faces the semiconductor device IC, and connection members such as a bump and a bonding wire that connect a terminal arranged in the base to a terminal arranged in the semiconductor device IC. The equipment EQP can further include at least one of an optical system OPT, a control device CTRL, a processing device PRCS, a display DSPL, and a memory device MMRY. The optical system OPT forms an optical image on the imaging surface of the imaging apparatus IS and is formed from, for example, a lens, a shutter, and a mirror. The control device CTRL controls the operation of the imaging apparatus IS and is a semiconductor device such as an ASIC. The processing device PRCS processes signals output from the imaging apparatus IS and is a semiconductor device such as a CPU or an ASIC for forming an AFE (Analog Front End) or a DFE (Digital Front End). The display DSPL is an EL display or a liquid crystal display that displays information (image) acquired by the imaging apparatus IS. The memory device MMRY is a magnetic device or a semiconductor device for storing information (image) acquired by the imaging apparatus IS. The memory device MMRY is a volatile memory such as an SRAM, DRAM, or the like or a nonvolatile memory such as a flash memory, a hard disk drive, or the like. A mechanical device MCHN includes a driving unit or propulsion unit such as a motor, an engine, or the like. The mechanical device MCHN in the camera can drive the components of the optical system OPT for zooming, focusing, and shutter operations. In the equipment EQP, signals output from the imaging apparatus IS are displayed on the display DSPL and are transmitted externally by a communication device (not shown) included in the equipment EQP. Hence, the equipment EQP may further include the memory device MMRY and the processing device PRCS that are separate from a storage circuit unit and a calculation circuit unit included in a control/signal processing circuit to be provided in the imaging apparatus IS.

Figure 38A:
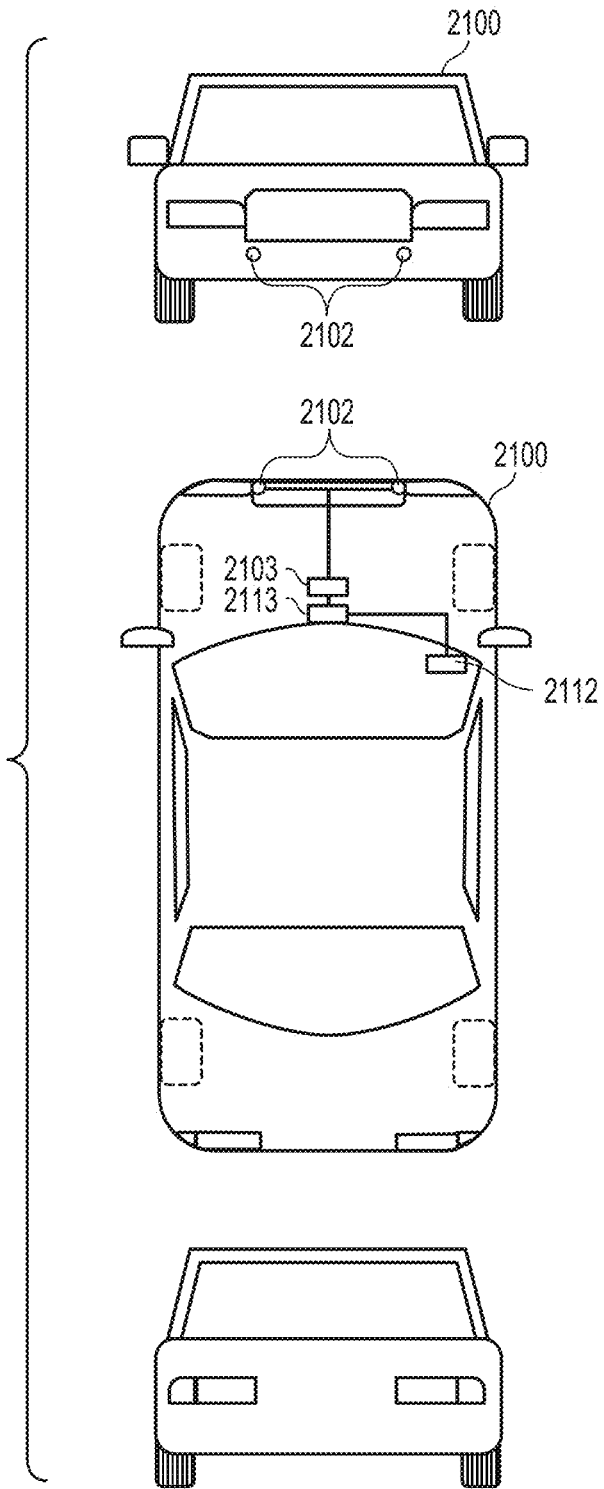
FIGS. 38A and 38B are schematic views showing the arrangement of a transportation equipment according to an embodiment.

The imaging apparatus IS is advantageous in reducing shading. Hence, a camera incorporating the imaging apparatus IS can be suitably applied as a monitoring camera, an onboard camera mounted in a transportation equipment such as an automobile or a railroad car, or the like. A case in which the camera incorporating the imaging apparatus IS formed as an imaging apparatus is applied to a transportation equipment will be exemplified here. A transportation equipment 2100 is, for example, an automobile including an onboard camera 2101 shown in FIGS. 38A and 38B. FIG. 38A schematically shows the outer appearance and the main internal structure of the transportation equipment 2100. The transportation equipment 2100 can include imaging apparatus 2102, an image sensing system ASIC (Application Specific Integrated Circuit) 2103, a warning device 2112, and a main control device 2113.

The above-described imaging apparatus IS is used in each imaging apparatus 2102. The warning device 2112 warns a driver when it receives an abnormality signal from an image-sensing system, a vehicle sensor, a control unit, or the like. The main control device 2113 comprehensively controls the operations of the image sensing system, the vehicle sensor, the control unit, and the like. Note that the transportation equipment 2100 need not include the main control device 2113. In this case, the image sensing system, the vehicle sensor, and the control unit each can individually include a communication interface and exchange control signals via a communication network (for example, CAN standards).

Figure 38B:
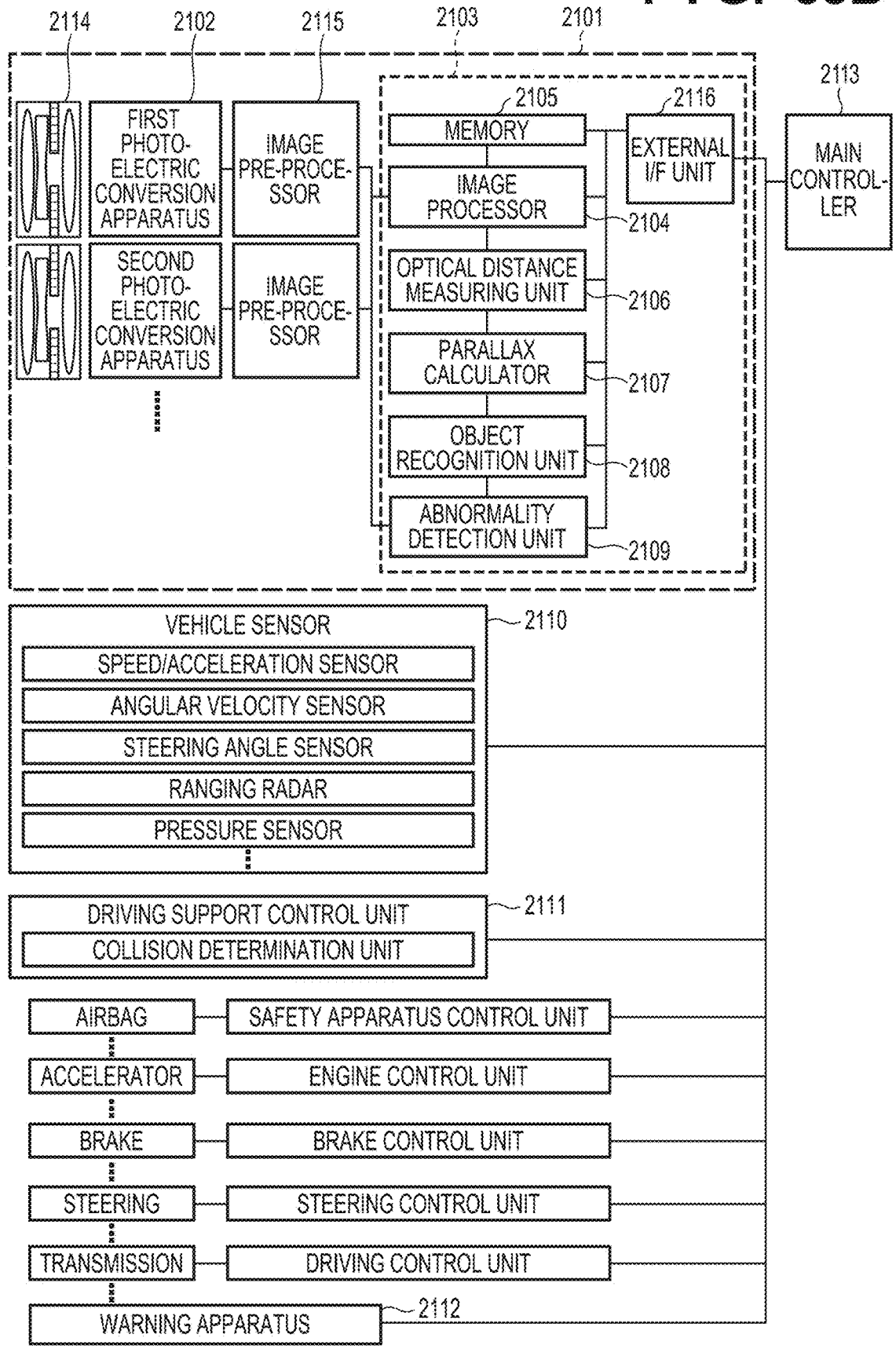

FIG. 38B is a block diagram showing the system arrangement of the transportation equipment 2100. The transportation equipment 2100 includes the first imaging apparatus 2102 and the second imaging apparatus 2102. That is, the onboard camera according to this embodiment is a stereo camera. An object image is formed by an optical unit 2114 on each imaging apparatus 2102. An image signal output from each imaging apparatus 2102 is processed by an image pre-processor 2115 and transmitted to the image sensing system ASIC 2103. The image pre-processor 2115 performs processing operations such as S-N calculation and synchronization signal addition. An aforementioned signal processor 902 corresponds to at least a part of the image pre-processor 2115 and the image sensing system ASIC 2103.

The image sensing system ASIC 2103 includes an image processor 2104, a memory 2105, an optical distance measuring unit 2106, a parallax calculator 2107, an object recognition unit 2108, an abnormality detection unit 2109, and an external interface (I/F) unit 2116. The image processor 2104 generates an image signal by processing signals output from the pixels of each imaging apparatus 2102. The image processor 2104 also performs correction of image signals and interpolation of abnormal pixels. The memory 2105 temporarily holds the image signal. The memory 2105 may also store the position of an abnormal pixel in the imaging apparatus 2102. The optical distance measuring unit 2106 uses the image signal to perform focusing on or distance measurement of an object. The parallax calculator 2107 performs object collation (stereo matching) of a parallax image. The object recognition unit 2108 analyzes image signals to recognize objects such as a transportation equipment, a person, a road sign, a road, and the like. The abnormality detection unit 2109 detects a failure or an error operation of the imaging apparatus 2102. When a failure or an error operation has been detected, the abnormality detection unit 2109 transmits a signal indicating the detection of an abnormality to the main control device 2113. The external I/F unit 2116 mediates the exchange of information between the units of the image sensing system ASIC 2103 and the main control device 2113 or the various kinds of control units.

The transportation equipment 2100 includes a vehicle information acquisition unit 2110 and a driving support unit 2111. The vehicle information acquisition unit 2110 includes vehicle sensors such as a speed/acceleration sensor, an angular velocity sensor, a steering angle sensor, a ranging radar, and a pressure sensor.

The driving support unit 2111 includes a collision determination unit. The collision determination unit determines whether there is a possibility of collision with an object based on the pieces of information from the optical distance measuring unit 2106, the parallax calculator 2107, and the object recognition unit 2108. The optical distance measuring unit 2106 and the parallax calculator 2107 are examples of distance information acquisition units that acquire distance information of a target object. That is, distance information is pieces of information related to the parallax, the defocus amount, the distance to the target object, and the like. The collision determination unit may use one of these pieces of distance information to determine the possibility of a collision. Each distance information acquisition unit may be implemented by dedicated hardware or a software module.

An example in which the driving support unit 2111 controls the transportation equipment 2100 so as to avoid a collision with another object has been described. However, the present invention is also applicable to a case in which automated driving control for following another vehicle or automated driving control for preventing the vehicle from drifting out of the lane is performed.

The transportation equipment 2100 also includes driving devices, which are used for movement or for supporting the movement, such as an air bag, an accelerator, a brake, a steering wheel, a transmission, an engine, a motor, wheels, propellers, and the like. The transportation equipment 2100 also includes control units for these devices. Each control unit controls a corresponding driving device based on a control signal of the main control device 2113.

The image sensing system used in each embodiment is applicable not only to an automobile and a railroad car but also to, for example, a transportation equipment such as a ship, an airplane, or an industrial robot. In addition, the image sensing system is applicable not only to a transportation equipment but also to an equipment that uses object recognition widely such as an ITS (Intelligent Transportation System).

The present invention is not limited to the above-described embodiments, and various changes and modifications can be made within the spirit and scope of the present invention. Therefore, to apprise the public of the scope of the present invention, the following claims are made. Note that the disclosed contents of this specification are not limited to those described in this specification, and include all matters graspable from this specification and the drawings accompanying this specification. Furthermore, the disclosed contents of this specification include a complement of each concept described in this specification. That is, for example, even if it is described as "A is greater than B" in this specification, it can be said that this specification discloses that "A is not greater than B" even if the description of "A is not greater than B" has been omitted. This is because a case in which it is described that "A is greater than B" presumes a case in which "A is not greater than B".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-122101, filed Jun. 28, 2019, which is hereby incorporated by reference herein in its entirety.

What is claimed is:

1. An imaging apparatus that includes a light receiving pixel, a first light shielded pixel, and a second light shielded pixel, wherein
the first light shielded pixel includes a first transfer transistor,
the second light shielded pixel includes a second transfer transistor,
an impurity concentration of a source of the first transfer transistor is lower than an impurity concentration of a source of the second transfer transistor,
the first light shielded pixel includes a first element isolation structure, and the second light shielded pixel includes a second element isolation structure different from the first element isolation structure, and
an area of an interface between a semiconductor region and an insulator in the first light shielded pixel is different from an area of an interface between a semiconductor region and an insulator in the second light shielded pixel.

2. The apparatus according to claim 1, wherein the light receiving pixel includes a third transfer transistor, and
a difference between the impurity concentration of the source of the first transfer transistor and the impurity concentration of the source of the second transfer transistor is greater than a difference between an impurity concentration of a source of the third transfer transistor and the impurity concentration of the source of the second transfer transistor.

3. The apparatus according to claim 1, wherein the light receiving pixel includes a third transfer transistor, and
an impurity concentration of a source of the third transfer transistor is equal to the impurity concentration of the source of the second transfer transistor.

4. The apparatus according to claim 1, wherein the light receiving pixel includes a third element isolation structure which has the same structure as the structure of the second element isolation structure.

5. The apparatus according to claim 1, wherein noise output from the first light shielded pixel is smaller than noise output from the second light shielded pixel.

6. The apparatus according to claim 1, wherein the area of the interface between the semiconductor region and the insulator in the first light shielded pixel is smaller than the area of the interface between the semiconductor region and the insulator in the second light shielded pixel.

7. The apparatus according to claim 1, wherein a volume of the semiconductor region in the first light shielded pixel is larger than a volume of the semiconductor region in the second light shielded pixel.

8. The apparatus according to claim 1, wherein the first element isolation structure does not include the insulator, and the second element isolation structure includes the insulator.

9. The apparatus according to claim 1, wherein the first element isolation structure includes a first insulator, and the second element isolation structure includes a second insulator which has a shape different from the first insulator.

10. The apparatus according to claim 1, wherein the first element isolation structure and the second element isolation structure have different DTI (Deep Trench Isolation) structures from each other.

11. The apparatus according to claim 10, wherein the first element isolation structure and the second element isolation structure have the same STI (Shallow Trench Isolation) structure.

12. The apparatus according to claim 1, wherein the first element isolation structure includes first element isolation configured to isolate the first light shielded pixels which are adjacent to each other, the second element isolation structure includes second element isolation configured to isolate the second light shielded pixels which are adjacent to each other, and the first element isolation and the second element isolation have different structures from each other.

13. The apparatus according to claim 1, wherein the first element isolation structure includes first element isolation configured to isolate a plurality of elements in the first light shielded pixel from each other, the second element isolation structure incudes second element isolation configured to isolate a plurality of elements in the second light shielded pixel from each other, and the first element isolation and the second element isolation have different structures from each other.

14. The apparatus according to claim 1, wherein the impurity concentration of the source of the first transfer transistor is lower than an impurity concentration of a drain of the first transfer transistor, and the impurity concentration of the source of the second transfer transistor is higher than an impurity concentration of a drain of the second transfer transistor.

15. An imaging apparatus that includes a light receiving pixel, a first light shielded pixel, and a second light shielded pixel, comprising:
a processing unit configured to process, based on a signal corresponding to an output of the first light shielded pixel and a signal corresponding to an output of the second light shielded pixel, a signal corresponding to an output of the light receiving pixel,
wherein the first light shielded pixel includes a first element isolation structure, and the second light shielded pixel includes a second element isolation structure which has a structure different from the first element isolation structure, and an area of an interface between a semiconductor region and an insulator in the first light shielded pixel is different from an area of an interface between a semiconductor region and an insulator in the second light shielded pixel.

16. The apparatus according to claim 15, wherein the first light shielded pixel includes a first transfer transistor,
the second light shielded pixel includes a second transfer transistor, and
an impurity concentration of a source of the first transfer transistor is lower than an impurity concentration of a source of the second transfer transistor.

17. The apparatus according to claim 15, wherein the processing unit determines, based on a difference between the signal corresponding to the output of the first light shielded pixel and the signal corresponding to the output of the second light shielded pixel, a signal to be used for processing the signal corresponding to the output of the light receiving pixel.

18. The apparatus according to claim 15, wherein the light receiving pixel, the first light shielded pixel, and the second light shielded pixel are mounted on a first semiconductor chip, and the processing unit is mounted on a second semiconductor chip.

19. The apparatus according to claim 18, wherein the first semiconductor chip and the second semiconductor chip are stacked.

20. An equipment comprising:
an imaging apparatus defined in claim 1; and
at least one of
an optical system configured to form an optical image on an imaging surface of the imaging apparatus; and
a display configured to display information acquired by the imaging apparatus.

* * * * *